United States Statutory Invention Registration [19]

[11] Reg. Number: H953

Goto et al. [43] Published: Aug. 6, 1991

[54] METHOD FOR PROCESSING SILVER HALIDE COLOR PHOTOGRAPHIC MATERIAL

[75] Inventors: Masatoshi Goto; Kiyoshi Morimoto; Haruhiko Iwano, all of Ashigara, Japan

[73] Assignee: Fuji Photo Film Co., Ltd., Ashigara, Japan

[21] Appl. No.: 389,667

[22] Filed: Aug. 4, 1989

[30] Foreign Application Priority Data

Aug. 5, 1988 [JP] Japan ..... 63-195773

[51] Int. Cl.[5] ..... G03C 7/00; G03C 5/44; G03C 5/18; G03C 5/38

[52] U.S. Cl. ..... 430/393; 430/430; 430/429; 430/455; 430/461

[58] Field of Search ..... 430/393, 430, 429, 455, 430/461

[56] References Cited

U.S. PATENT DOCUMENTS

| | | | |
|---|---|---|---|
| 2,487,446 | 12/1945 | Kellog | 430/393 |
| 4,707,434 | 11/1987 | Koboshi et al. | 430/393 |
| 4,745,048 | 5/1988 | Kishimoto et al. | 430/461 |
| 4,804,617 | 2/1989 | Nishikawa et al. | 430/430 |

FOREIGN PATENT DOCUMENTS

| | | | |
|---|---|---|---|
| 1290812 | 3/1969 | Fed. Rep. of Germany | 430/393 |

*Primary Examiner*—John S. Maples
*Assistant Examiner*—Philip Tucker
*Attorney, Agent, or Firm*—Sughrue, Mion, Zinn, Macpeak & Seas

[57] ABSTRACT

A method for processing a silver halide color photographic material which comprises the steps of, after color-developing, processing the silver halide color photographic material with a bleaching bath, and then processing with a fixing bath, wherein the bleaching bath has a pH value of from 2.5 to 5.5 and contains a (1,3-diaminopropane-tetraacetato)iron(III) complex salt in an amount of at least 0.2 mol/liter and an organic acid in an amount of at least 0.5 mil/liter, and the fixing bath contains at least one compound selected from formulae (I), (II), (III), (IV), and (V):

$$R^1-(X-R^3)_m-X-R^2 \quad (I)$$

wherein m represents 0 or an integer of from 1 to 4; $R^1$ and $R^2$ each represents a substituted or unsubstituted alkyl group; $R^3$ represents a substituted or unsubstituted alkylene group, provided that when m is 2 or more, the $R^3$ groups in each of the $(X-R^3)$ segments may be the same or different; and X represents sulfur, oxygen, (II)

wherein Z represents $-OR^{15}$ or $-SR^{16}$; $R^{11}$, $R^{12}$, $R^{13}$, $R^{14}$, $R^{15}$ and $R^{16}$ each represents an alkyl group, an alkenyl group, an aralkyl group, an aryl group or a heterocyclic group; and $R^{11}$ and $R^{12}$; $R^{13}$ and $R^{14}$; or $R^{11}$ and $R^{13}$; $R^{11}$ and $R^{15}$; or $R^{11}$ and $R^{16}$ may be bonded to each other to form a 5-membered or 6-membered hetero-ring;

(III)

wherein A represents an alkylene group; $R^{20}$ represents $-NH_2$, $-NHR^{21}$, $-CONHR^{24}$, $-OR^{24}$, $-COOM$, $-COOR^{21}$, $-SO_2NHR^{24}$, $-NHCOR^{21}$ or $-SO_3M$; p represents 1 or 2; L represents $-S^{\ominus}$ when $R^{20}$ is and L represents $-SM$ otherwise; $R^{21}$, $R^{22}$ and $R^{23}$ each represents an alkyl group; $R^{24}$ represents hydrogen or an alkyl group; and M represents hydrogen or a cation:

(Abstract continued on next page.)

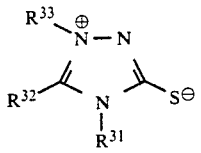

(IV)

wherein $R^{31}$ represents a hydroxyl group, an alkyl group, an alkenyl group, a cycloalkyl group, an aryl group, a heterocyclic group, an amino group, an acyloxy group or an alkyloxy group; $R^{32}$ represents hydrogen, an alkyl group, a cycloalkyl group, an aryl group or a heterocyclic group; and $R^{33}$ represents an alkyl group, an alkenyl group, a cycloalkyl group, an aryl group or a heterocyclic group.

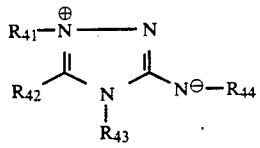

(V)

wherein $R_{41}$, $R_{42}$, $R_{43}$ and $R_{44}$ each represents a substituted or unsubstituted alkyl group, a substituted or unsubstituted alkenyl group, a substituted or unsubstituted cycloalkyl group, a substituted or unsubstituted aryl group or a substituted or unsubstituted heterocyclic group; or $R_{41}$ and $R_{42}$, or $R_{43}$ and $R_{44}$ may be bonded to each other to form a ring.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PROCESSING SILVER HALIDE COLOR PHOTOGRAPHIC MATERIAL

FIELD OF THE INVENTION

The present invention relates to a method for processing, comprising developing, bleaching and fixing (hereinafter referred to as "processing") an exposed silver halide color photographic material. "Silver halide color photographic material" is hereinafter referred to as a "color photographic material". In particular, the present invention relates to a method for processing a color photographic material, having an accelerated bleaching action and fixing action, and a shortened processing time, and wherein the stability of the accelerated fixing action in continuous processing is extremely improved and the image storability of the processed material is improved.

BACKGROUND OF THE INVENTION

In general, the basic procedure for processing color photographic materials comprises color developing and desilvering. In the color developing step, the exposed silver halide is reduced with a color developing agent, while the oxidized color developing agent reacts with a coupler to form a color image. In the subsequent desilvering step, the silver formed in the previous color developing step is oxidized by the action of an oxidizing agent, which is generally called a "bleaching agent", and is then dissolved by the action of a silver ion complexing agent, which is generally called a "fixing agent". After the desilvering step, the thus processed color photographic material is said to have a color image formed thereon.

The desilvering step may be effected using two baths comprising a bleaching bath containing a bleaching agent, and a fixing bath containing a fixing agent, or alternatively, using a single type of bleach fixing bath containing both a bleaching agent and a fixing agent.

The actual developing process includes, in addition to the above-mentioned basic steps, various auxiliary steps which serve to maintain the photographic and physical properties of the images thus formed, and to improve the storability of the images. For example, such auxiliary steps may comprise a hardening bath, a stopping bath, an image-stabilizing bath and a rinsing bath.

Recently, a small-sized photographic processing service shop system, called a "mini-laboratory", has become popular, and shortening of the time necessary for the processing in such a system is strongly in demand.

In particular, shortening of the time for desilvering step, which accounts for the greater part of the processing time, is most highly desirable.

However, ethylenediamine-tetraacetato/ferric complexes, which are the most widely used bleaching agents in conventional bleaching solutions or bleach-fixing solutions, are disadvantageous in that they have a weak oxidizing power, and do not satisfy the above noted demand for a reaction in the desilvering time despite various improvements such as the addition of a bleaching accelerator to the complex. On the other hand, potassium ferrocyanide, dichromates, ferric chloride, persulfates and bromates are known as a bleaching agents having a strong oxidizing power. However, these strong bleaching agents are disadvantageous with regard to environmental factors, safety, and metal corrosion. Accordingly, the above-noted strong bleaching agents may not be used publicly in a photographic process service shop system.

The bleaching solution described in JP-A-62-222252 (the term "JP-A"as used herein means an "unexamined published Japanese patent application"), which contains a (1,3 -diaminopropanetetraacetato)iron(III) complex salt and has a pH value of about 6, has a stronger oxidizing power than a bleaching solution containing an ethylenediaminetetraacetato/ferric complex. The bleaching solution containing a (1,3-diaminopropanetetraacetoto)iron(III) complex salt can be used in a rapid silver-bleaching procedure, but causes color fog, called "bleached fog", when the color-developed material is directly bleached with the bleaching solution without using an intermediate bath between the color-development bath and the bleaching bath.

Apart from the problem of bleached fog, when a color-developed photographic material is processed with the bleaching solution in a shortened period of time, the processed photograph noticeably stains upon storage.

Acceleration of the fixing step is proposed by G. M. Haist, *Modern Photographic Processing* (published by John Wiley & Sons Co. 1979), Vol. 1, pages 558 to 630 and Vol. 2, pages 574 to 600.

Acceleration of the fixing step would be possible by the combination of known fixation-accelerating techniques, but when such techniques are combined with the above-mentioned bleaching bath, other problems arise as described below.

Particularly, in the continuous processing of silver halide color photographic materials, a portion of the bleaching solution is generally carried over to the fixing bath together with the material being processed. However, compounds which accelerate the fixing action generally form insoluble precipitates or lose the fixation-accelerating ability when the bleaching solution of JP-A-62-222252 is introduced into the fixing bath.

In addition, if the pH value of the processing bath containing the compound described in JP-A-62-222252 is lowered to further shorten the bleaching time, the problem becomes more severe.

SUMMARY OF THE INVENTION

Accordingly, one object of the present invention is to provide a method for processing a color photographic material, where the desilvering step is effected in a rapid and stable manner.

Another object of the present invention is to provide a method for processing a color photographic material, where the formation of stain in the processed material during storage, caused by the bleaching solution remaining in the processed material, is minimized.

The objects of the present invention have been attained by a method for processing a silver halide color photographic material which comprises the steps of, after color developing, processing said silver halide color photographic material with a bleaching bath, and then processing with a fixing bath, wherein the bleaching bath has a pH value of from 2.5 to 5.5 and contains a (1,3-diaminopropane-tetraacetato)iron(III) complex salt in an amount of at least 0.2 mol/liter and an organic acid in an amount of at least 0.5 mol/liter, and the fixing bath contains at least one compound selected from formulae (I), (II), (III), (IV), and (V):

$$R^1—(X—R^3)_m—X—R^2 \quad (I)$$

wherein m represents 0 or an integer of from 1 to 4; $R^1$ and $R^2$ (which may be the same or different) each represents a substituted or unsubstituted alkyl group; $R^3$ represents a substituted or unsubstituted alkylene group, provided that when m is 2 or more, the $R^3$ groups in each of the $(X—R^3)$ segments may be the same or different; and X represents oxygen, sulfur,

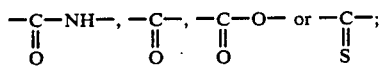

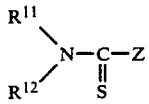

(II)

wherein z represents

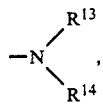

$—OR^{15}$ or $—SR^{16}$; $R^{11}$, $R^{12}$, $R^{13}$, $R^{14}$, $R^{15}$ and $R^{16}$ (which may be the same or different) each represents an alkyl group, an alkenyl group, an aralkyl group, an aryl group of a heterocyclic group (which may optionally be substituted). Preferably, the number of the total carbon atoms in each group is 30 or less. $R^{11}$ and $R^{12}$; $R^{13}$ and $R^{14}$; or $R^{11}$ and $R^{13}$; $R^{11}$ and $R^{15}$; or $R^{11}$ and $R^{16}$ may be bonded to each other to form a 5-membered or 6-membered hetero-ring (which may be substituted).

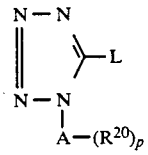

(III)

wherein A represents an alkylene group; $R^{20}$ represents $—NH_2$, $—NHR^{21}$,

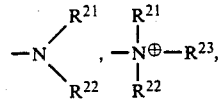

$—CONHR^{24}$, $—OR^{24}$, —COOM, $—COOR^{21}$, $—SO_2NHR^{24}$, $—NHCOR^{21}$ or $—SO_3M$. Preferably, the number of the total carbon atoms in each group is 30 or less. p represents 1 or 2; L represents $—S^{\ominus}$ when $R^{20}$ is

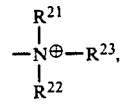

and L represents —SM otherwise; $R^{21}$, $R^{22}$ and $R^{23}$ each represents an alkyl group; $R^{24}$ represents hydrogen or an alkyl group; and M represents hydrogen or a cation (for example, an alkali metal ion such as sodium and potassium or ammonium ion).

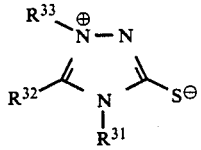

(IV)

wherein $R^{31}$ represents a hydroxyl group, an alkyl group, an alkenyl group, a cycloalkyl group, an aryl group, a heterocyclic group, an amino group, an acyloxy group or an alkyloxy group; $R^{32}$ represents hydrogen, an alkyl group, a cycloalkyl group, an aryl group or a heterocyclic group; and $R^{33}$ represents an alkyl group, an alkenyl group, a cycloalkyl group, an aryl group or a heterocyclic group.

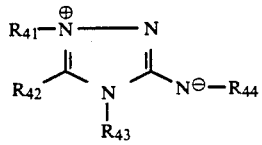

(V)

wherein $R_{41}$, $R_{42}$, $R_{43}$ and $R_{44}$ each represents a substituted or unsubstituted alkyl group, a substituted or unsubstituted alkenyl group, a substituted or unsubstituted cycloalkyl group, a substituted or unsubstituted aryl group or a substituted or unsubstituted heterocyclic group; or $R_{41}$ and $R_{42}$, or $R_{43}$ and $R_{44}$ may be bonded to each other to form a ring.

DETAILED DESCRIPTION OF THE INVENTION

These compounds are defined in detail below.

$$R^1—(X—R^3)_m—X—R^2 \quad (I)$$

wherein m represents 0 or an integer of from 1 to 4; $R^1$ and $R^2$ may be the same or different and each represents a lower alkyl group (having from 1 to 5 carbon atoms) or a substituted alkyl group (having from to 30 total carbon atoms.

Substituents thereof include, for example, —OH, —COOM, $—SO_3M$, $—NHR^4$, $—NR^4R^4$ (where each $R^4$ group may be the same or different), $—OR^4$, $—CONHR^4$, $—COOR^4$,

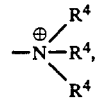

a heterocyclic group having at least one nitrogen atom and a quaternated nitrogen-containing heterocyclic group.

$R^4$ represents hydrogen, a lower alkyl group or an alkyl group substituted by the above-noted substituent(s). The substituted alkyl group may have two or more substituents which may be the same or different.

$R^3$ represents a substituted or unsubstituted alkylene group. Substituents for the group $R^3$ include, for example, a hydroxyl group, a carboxyl group, a sulfo group, an amino group and an alkyl-substituted amino group. When m is 2 or more, the $R^3$ groups in each of the $(X—R^3)$ segments may be the same or different.

X represents sulfur, oxygen,

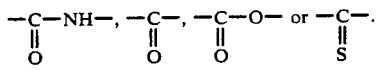

Preferably, X is sulfur.

$R^1$ and $R^2$ may be bonded to each other to form a ring.

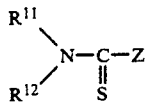

(II)

wherein Z represents

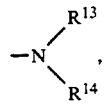

—$OR^{15}$ or —$SR^{16}$, $R^{11}$, $R^{12}$, $R^{13}$, $R^{14}$, $R^{15}$ and $R^{16}$ may be the same or different and each represents an alkyl group, an alkenyl group, an aralkyl group, an aryl group or á heterocyclic group, which may optionally be substituted. Preferably, the number of the total carbon atoms in each group is 30 or less.

$R^{11}$ and $R^{12}$; $R^{13}$ and $R^{14}$; or $R^{11}$ and $R^{13}$; $R^{11}$ and $R^{15}$; or $R^{11}$ and $R^{16}$ may be bonded to each other to form a 5-membered or 6 membered hetero-ring, which may optionally be substituted.

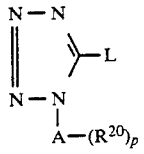

(III)

wherein A represents an alkylene group; $R^{20}$ represents —$NH_2$, —$NHR^{21}$,

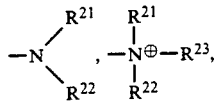

—$CONHR^{24}$, —$OR^{24}$, —COOM, —$COOR^{21}$, —$SO_2NHR^{24}$, —$NHCOR^{21}$ or —$SO_3M$. Preferably, the number of the total carbon atoms in each group is 30 or less. p represents 1 or 2; L represents —$S^{\ominus}$ when $R^{20}$ is

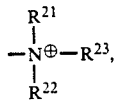

and L represents —SM otherwise.

$R^{21}$, $R^{22}$ and $R^{23}$ each represents an alkyl group.

$R^{24}$ represents hydrogen or an alkyl group.

M represents hydrogen or a carbon (for example, an alkali metal ion or ammonium ion).

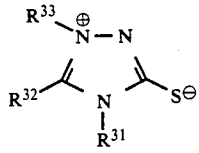

(IV)

wherein $R^{31}$ represents a hydroxyl group, a substituted or unsubstituted alkyl group having from 1 to 30 carbon atoms (preferably 10 or less carbon atoms)(e.g., methyl, ethyl, lauryl, 2-methoxyethyl, ethoxycarbonyl), a substituted or unsubstituted alkenyl group having from 3 to 30 carbon atoms (preferably 10 or less carbon atoms) (e.g., allyl, 2-buten-1-yl), a substituted or unsubstituted cycloalkyl group having from 3 to 30 carbon atoms (preferably 10 or less carbon atoms) (e.g., cyclopentyl, cyclohexyl), a substituted or unsubstituted aryl group having from 6 to 30 carbon atoms (preferably 16 or less carton atoms) (e.g., phenyl, 4-methoxyphenyl, 3,4-dichlcrophenyl, 4-sulfamoylphenyl, 4-lauroylamidophenyl), a substituted or unsubstituted heterocyclic group having from 1 to 30 carbon atoms, and preferably not exceeding 16 carbon atoms e.g., 2-pyridyl, 1-octylpiperidin-4-yl), —$NR^{34}R^{35}$, wherein $R^{34}$ and $R^{35}$ each represents hydrogen, a substituted or unsubstituted alkyl group having from 1 to 30 carbon atoms, and preferably nor exceeding 10 carbon atoms (e.g., methyl, ethyl, ethoxycarbonylmethyl, 2-methoxyethyl), a substituted or unsubstituted acyl group having from 1 to 30 carbon atoms, and preferably not exceeding 10 carbon atoms e.g., acetyl, octanoyl) or a substituted or unsubstituted aryl group having from 6 to 30 carbon atoms, and preferably not exceeding 16 carbon atoms (e.g., phenyl, 4-chlorophenyl); and $R^{34}$ and $R^{35}$ may be bonded to each other to form a ring, a substituted or unsubstituted acyloxy group having from 1 to 30 carbon atoms, and preferably not exceeding 10 carbon atoms (e.g., acetoxy, benzoyloxy), or a substituted or unsubstituted alkyloxy group having from 1 to 30 carbon atoms, and preferably not exceeding 10 carbon atoms (e.g., methoxy, 2-methoxyethoxy).

In the formula (IV), $R^{32}$ represents hydrogen, a substituted or unsubstituted alkyl group having from 1 to 30 carbon atoms, and preferably not exceeding 10 carbon atoms (e.g., methyl, isobutyl, tert-butyl, metylthiomethyl), a substituted or unsubstituted cycloalkyl group having from 3 to 30 carbon atoms, and preferably not exceeding 10 carbon atoms (e.g., cyclopentyl, cyclohexyl) , a substituted or unsubstituted aryl group having from 6 to 30 carbon atoms, and preferably not exceeding 16 carbon atoms (e.g., phenyl, 4-methoxyphenyl, 4-chlorophenyl) or a substituted or unsubstituted heterocyclic group having from 1 to 30 carbon atoms, and preferably not exceeding 16 carbon atoms (e.g., 2-pyridyl, 2-furyl).

In formula (IV), $R^{33}$ represents a substituted or unsubstituted alkyl group having from 1 to 30 carbon atoms, and preferably not exceeding 10 carbon atoms (e.g., methyl, ethyl, octyl, octadecyl, methoxyethyl), a substituted or unsubstituted alkenyl group having from 1 to 30 carbon atoms, and preferably not exceeding 10 carbon atoms (e.g., allyl, 2-buten-1-yl), a substituted or unsubstituted cycloalkyl group having from 1 to 30 carbon atoms, and preferably not exceeding 10 carbon atoms (e.g., cyclopentyl, cyclohexyl), a substituted or unsubstituted aryl group having from 6 to 30 carbon atoms, and preferably not exceeding 16 carbon atoms (e.g., phenyl, 4-ethoxycarbonylphenyl, 3-sulfamoylphenyl, 4-methoxyphenyl) or a substituted or unsubstituted heterocyclic group having from 1 to 30 carbon atoms, and preferably not exceeding 16 carbon atoms (e.g., 4-pyridyl, 2-pyridyl).

$R^{31}$ and $R^{32}$; or $R^{32}$ and $R^{33}$ may be bonded to each other to form a 5- to 7-membered ring or a heteroring.

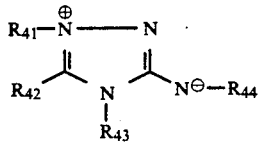

(V)

wherein $R_{41}$, $R_{42}$, $R_{43}$ and $R_{44}$ each represents a substituted or unsubstituted alkyl group having from 1 to 30 carbon atoms (e.g., methyl, ethyl, n-propyl, t-butyl, isobutyl, n-pentyl, n-undecyl, n-heptadecyl, methoxymethyl, methoxyethyl, phenethyl), a substituted or unsubstituted alkenyl group having from 3 to 30 carbon atoms (e.g., allyl), a substituted or unsubstituted cycloalkyl group having from 3 to 30 carbon atoms (e.g., cyclohexyl), a substituted or unsubstituted aryl group having from 6 to 30 carbon atoms (e.g., phenyl, naphthyl, 4-methylphenyl, 4-carboxyphenyl, 3,4-dichlorophenyl, 4-methanesulfonylphenyl, 4-chlorophenyl, 4-ethoxycarbonylphenyl), or a substituted or unsubstituted heterocyclic group having from 1 to 30 carbon atoms (e.g., 2-pyridyl, 4-pyridyl, 2-thienyl, 3-furyl, 2-quinolyl), $R_{41}$ and $R_{42}$; or $R_{43}$ and $R_{44}$ may be bonded to each other to form a ring. The compound of the formula (V) may form a salt (e.g., acetate, nitrate, salicylate, hydrochloride, iodate, bromate).

In the formula (V), $R_{41}$ $R_{43}$ and $R_{44}$ preferably represent a substituted or unsubstituted aryl group having from 6 to 20 carbon atoms; and $R_{42}$ preferably represents a substituted or unsubstituted alkyl group having from 1 to 10 carbon atoms or a substituted or unsubstituted aryl group having from 6 to 20 carbon atoms.

Non-limiting examples of compounds of the formulae (I) to (V) are given below, as follows.

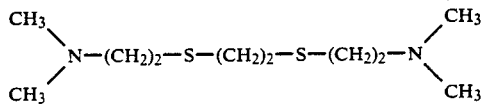

(1)

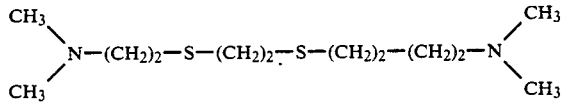

(2)

$HO(CH_2)_2S(CH_2)_2OH$ (3)

$HO\leftarrow CH_2)_6S(CH_2)_5S(CH_2)_6OH$ (4)

$HO\leftarrow CH_2)_2-S-(CH_2)_2-S-(CH_2)_2-OH$ (5)

$HO\leftarrow CH_2)_3-S-(CH_2)_2-S-(CH_2)_3-OH$ (6)

$HO\leftarrow CH_2)_6-S-(CH_2)_2-S-(CH_2)_6-OH$ (7)

$HO(CH_2)_2S(CH_2)_2S(CH_2)_2S(CH_2)_2OH$ (8)

$HO(CH_2)_2S(CH_2)_2O(CH_2)_2O(CH_2)_2S(CH_2)_2OH$ (9)

$HOOCCH_2S(CH_2)_2SCH_2COOH$ (10)

$H_2NCO(CH_2)_2S(CH_2)_2S(CH_2)_2CONH_2$ (11)

$NaO_3S(CH_2)_3S(CH_2)_2S(CH_2)_3SO_3Na$ (12)

$HO(CH_2)_2S(CH_2)_2CONHCH_2NHCO(CH_2)_2S(CH_2)_2OH$ (13)

(14)

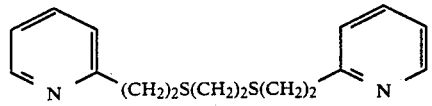

$HOCH_2\underset{\underset{OH}{|}}{C}HCH_2S(CH_2)_2SCH_2\underset{\underset{OH}{|}}{C}HCH_2OH$ (15)

$HOCH_2\underset{\underset{OH}{|}}{C}HCH_2S(CH_2)_2S(CH_2)_2SCH_2\underset{\underset{OH}{|}}{C}HCH_2OH$ (16)

$HOOC\underset{\underset{NH_2}{|}}{C}HCH_2S(CH_2)_2SCH_2\underset{\underset{NH_2}{|}}{C}HCOOH$ (17)

$HOCH_2\underset{\underset{OH}{|}}{C}HCH_2S(CH_2)_2CONHCH_2NHCO(CH_2)_2SCH_2\underset{\underset{OH}{|}}{C}HCH_2O$ (18)

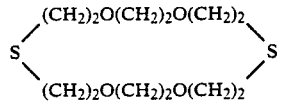

(19)

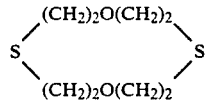

(20)

-continued
$CH_3SCH_2CH(NH_2)COOH$ (21)
$C_2H_5S(CH_2)_2S(CH_2)_2NHCO(CH_2)_2COOH$ (22)
(23)
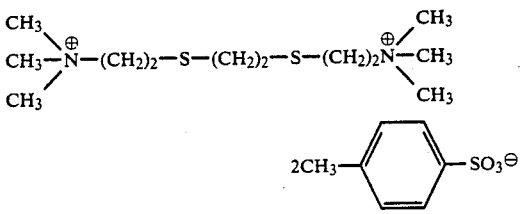
(24)
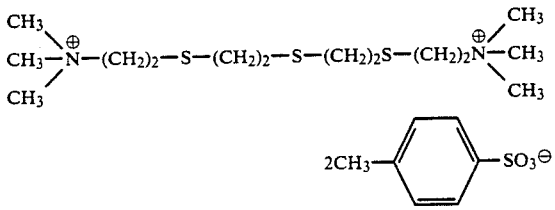
(25)
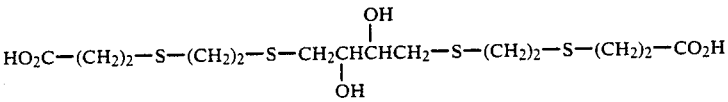
(26)
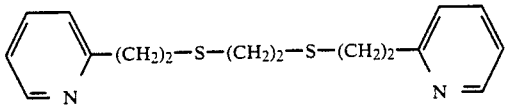
(27)
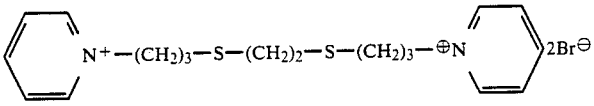
(28)
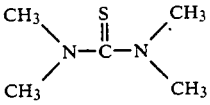
(29)
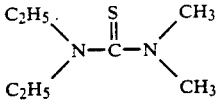
(30)
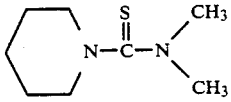
(31)
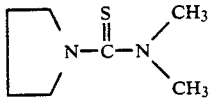
(32)
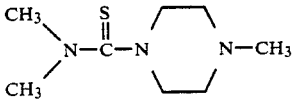
(33)
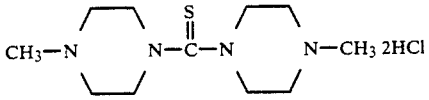

-continued
(34)
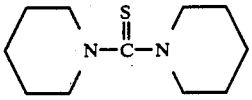
(35)
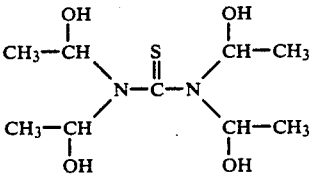
(36)
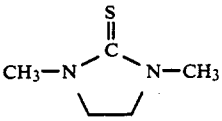
(37)
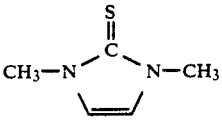
(38)
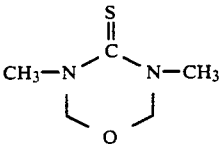
(39)
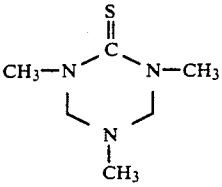
(40)
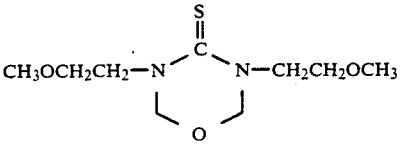
(41)
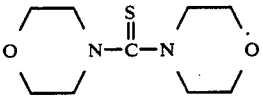
(42)
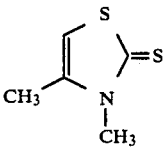
(43)
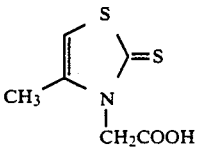
(44)
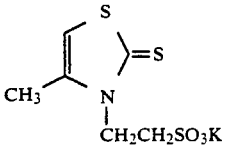

-continued
(45)
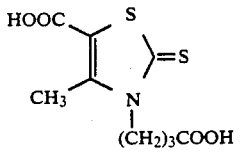
(46)
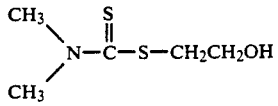
(47)
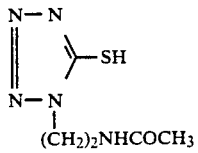
(48)
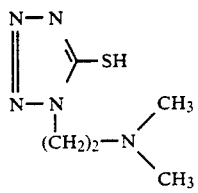
(49)
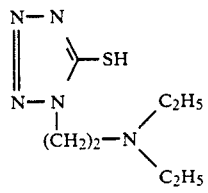
(50)
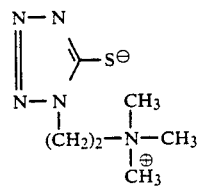
(51)
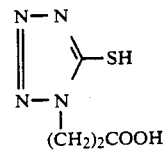
(52)
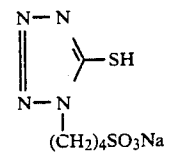
(53)
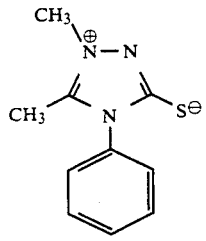

-continued
(54)
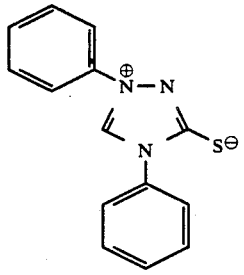
(55)
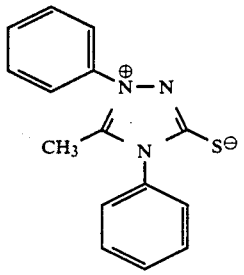
(56)
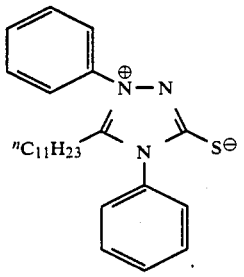
(57)
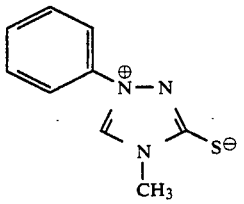
(58)
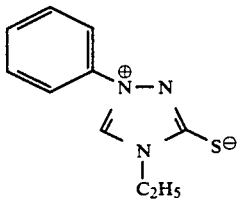
(59)
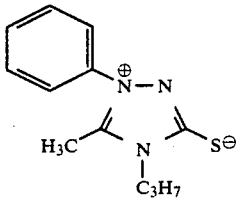

-continued
(60)
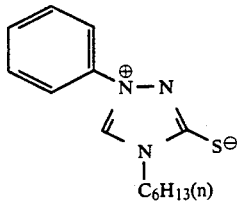
(61)
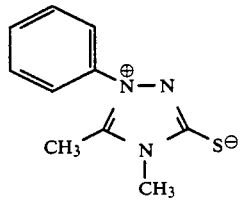
(62)
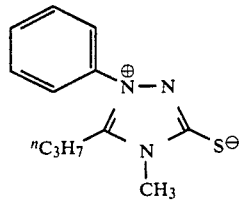
(63)
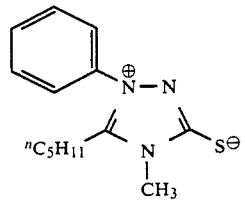
(64)
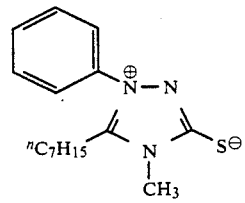
(65)
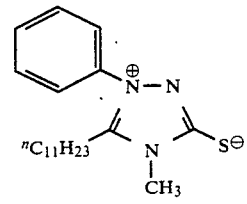
(66)
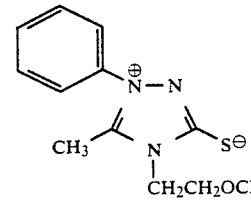

-continued
(67)
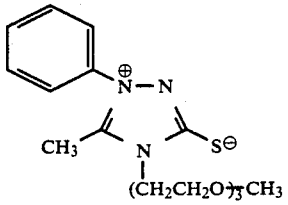
(68)
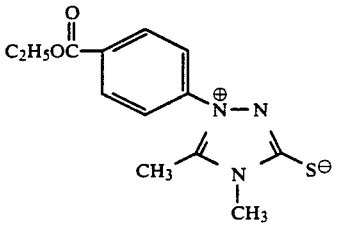
(69)
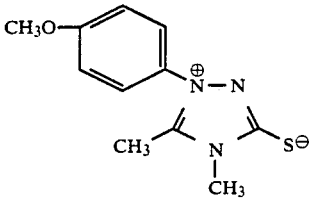
(70)
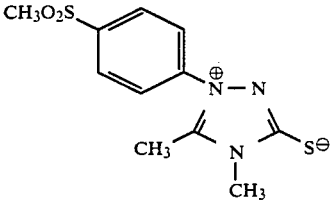
(71)
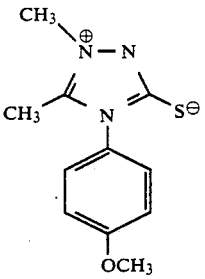
(72)
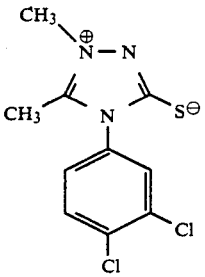
(73)
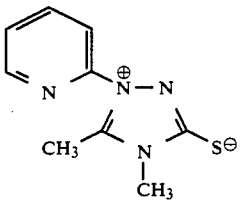

-continued
(74)
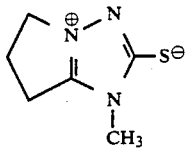
(75)
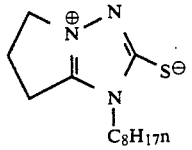
(76)
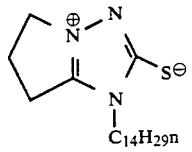
(77)
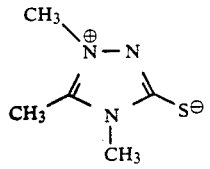
(78)
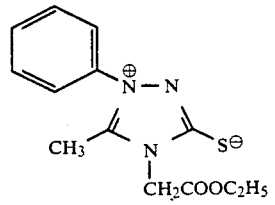
(79)
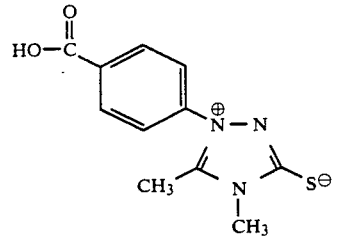
(80)
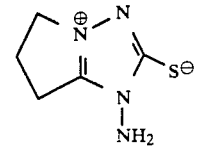
(81)
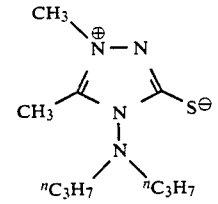

-continued
(82)
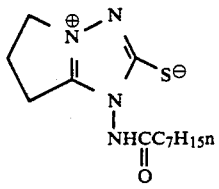
(83)
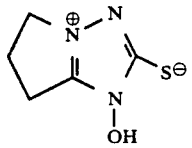
(84)
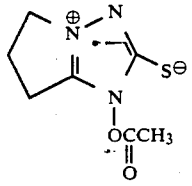
(85)
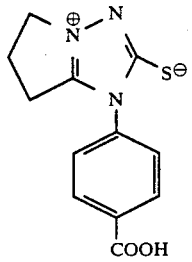
(86)
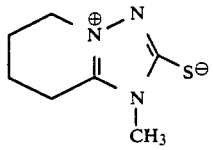
(87)
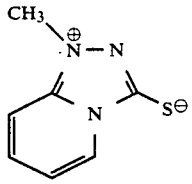
(88)
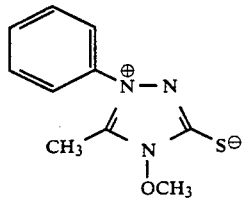
(89)
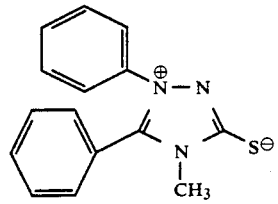

-continued
(90)
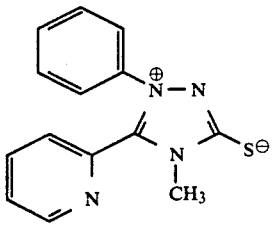
(91)
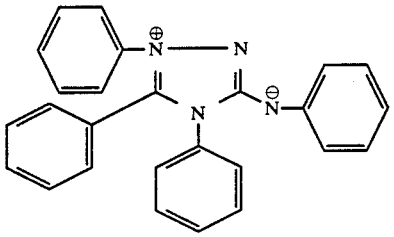
(92)
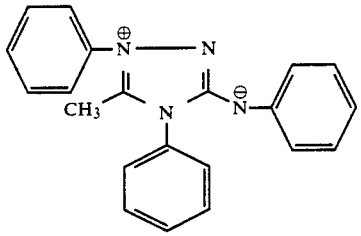
(93)
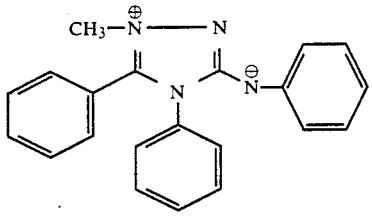
(94)
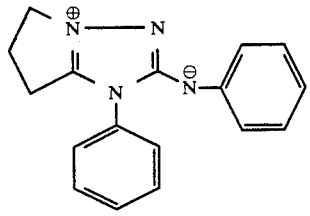
(95)
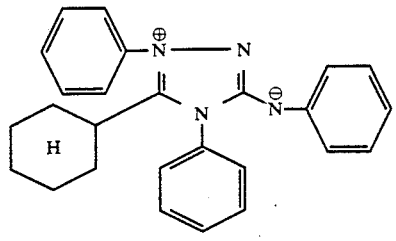

-continued
(96)
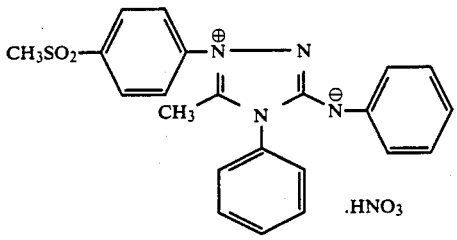
(97)
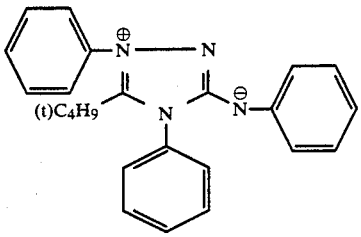
(98)
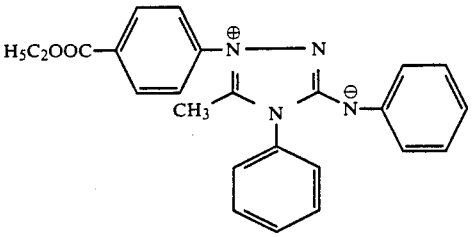
(99)
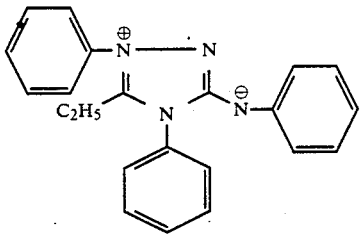
(100)
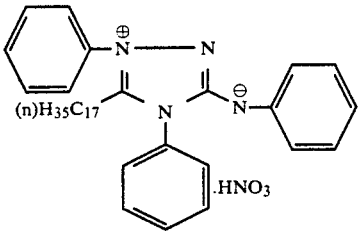
(101)
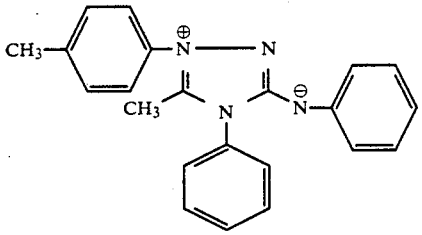

-continued
(102)
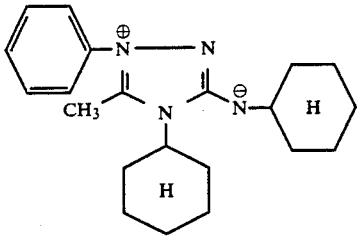
(103)
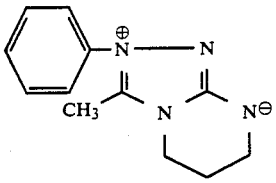
(104)
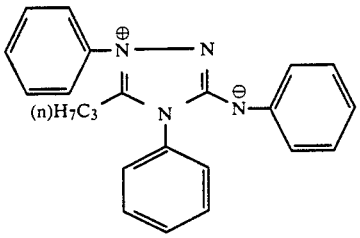
(105)
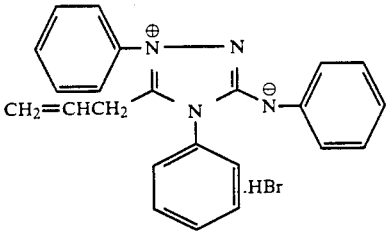
(106)
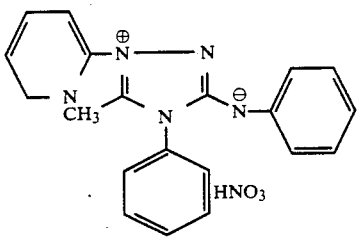
(107)
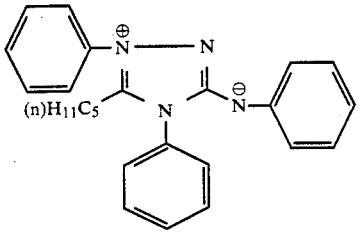

-continued
(108)
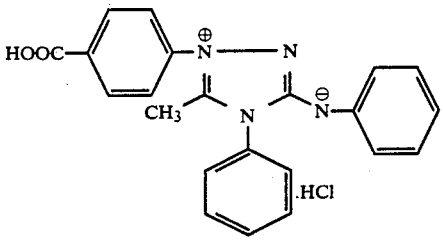
(109)
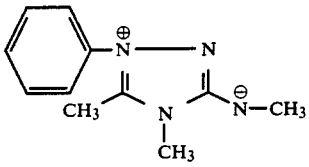
(110)
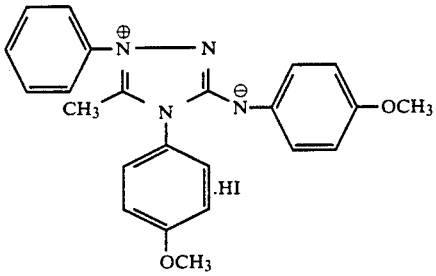
(111)
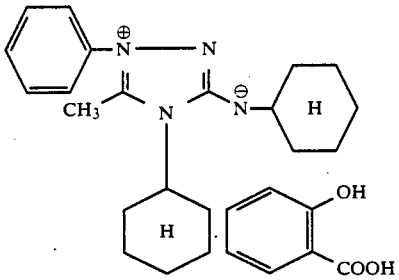
(112)
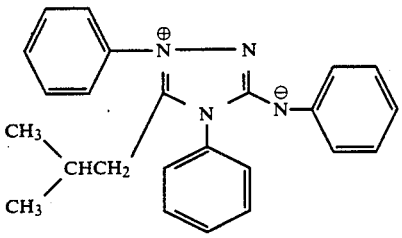
(113)
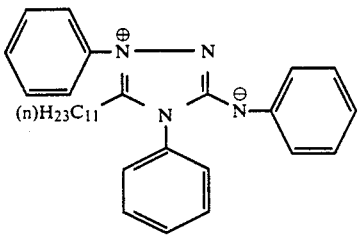

-continued (114)

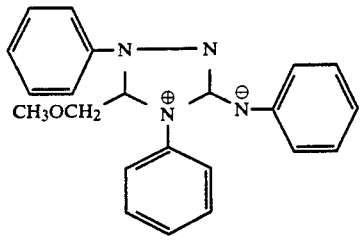

(115)

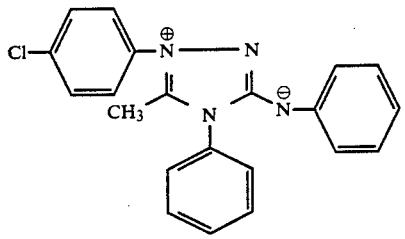

(116)

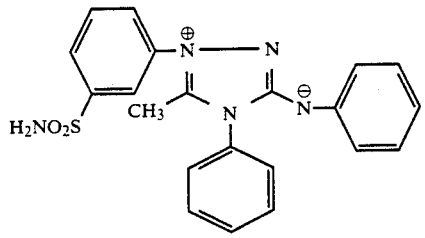

Where a fixing solution containing the above-described silver halide-solubilizing compound of formulae (I), (II), (III), (IV) and (V) is combined with the (1,3-diaminopropanetetraacetato)iron(III) complex salt-containing bleaching solution as described in JP-A-62-222252, advantageous properties are obtained, including (1) both the bleaching rate and the fixing rate are much higher as compared to the combination of a conventional bleaching solution containing EDTA/Fe(III) complex or diethylenetriamine-pentaacetato/ferric complex and a conventional fixing solution, (2) the image formed on the material processed by a running procedure where the material is continuously processed and includes addition of a replenisher to the processing system does not become stained, even after storage of the processed material and (3) the fixation-accelerating effect is not reduced in continuous processing.

It has been found that the method of the present invention is especially effectively applied to a photographic material containing a magenta coupler of the following formula (M-1) whereupon not only the bleaching action and the fixing action are accelerated, but also the material thus processed is almost free from bleached fog, and additionally, formation of stains in the processed material upon storage is minimal. The above described effects of the present invention are especially pronounced, when the method of the present invention is applied to photographic materials containing the following magenta coupler:

(M-1)

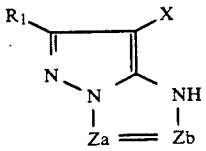

wherein Za and Zb each represents —CH=,

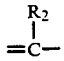

or =N—; $R_1$ and $R_2$ each represents hydrogen or a substituent; X represents a hydrogen atom or a group which releases upon coupling with the oxidation product of an aromatic primary amine developing agent; and when Za=Zb is carbon-carbon a double bond, Za=Zb is optionally part of an aromatic ring moiety.

Among the pyrazoloazole magenta couplers of the formula (M-1), those of the following formulae (M-2), (M-3), (M-4), (M-5) and (M-6) are preferred.

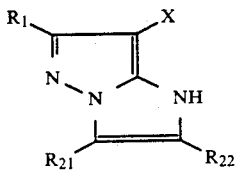

(M-2)

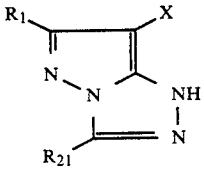

(M-3)

-continued

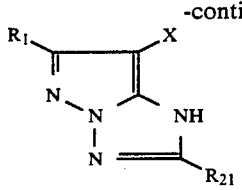

(M-4)

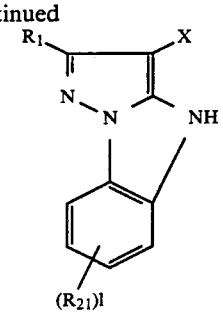

(M-5)

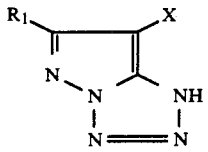

(M-6)

In the formulae (M-2) to (M-6), $R_1$ and X have the same meanings as those defined in the formula (M-1); $R_{21}$ and $R_{22}$ have the same meaning as $R_2$ in the formula M 1); and l represents an integer of from 1 to 4.

Pyrazoloazole magenta couplers of the formulae (M-2) to (M-6) are explained in detail as follows.

$R_1$, $R_{21}$ and $R_{22}$ each represents hydrogen, a halogen atom (e.g., fluorine, chlorine), an alkyl group (e.g., methyl, ethyl, isopropyl, 1-butyl, t-butyl, 1-octyl), an aryl group (e.g., phenyl, p-tolyl, 4-nitrophenyl, 4-ethoxyphenyl, 2-(2-octyloxy-5-t-octylbenzenesulfonamido)-phenyl, 3-dodecanesulfonamidophenyl, 1-naphthyl), a heterocyclic group (e.g., 4-pyridyl, 2-furyl), a hydroxyl group, an alkoxy group (e.g., methoxy, ethoxy, 1-butoxy, 2-phenoxyethoxy, 2-(2,4-di-t-amylphenoxy)ethoxy), an aryloxy group (e.g., phenoxy, 2-methoxyphenoxy, 4-methoxyphenoxy, 4-nitrophenoxy, 3-butanesulfonamidophenoxy, 2,5-di-t-amylphenoxy, 2-naphthoxy), a heterocyclic-oxy group (e.g., 2-furyloxy), an acyloxy group (e.g., acetoxy, pivaloyloxy, benzoyloxy, dodecanoyloxy), an alkoxycarbonyloxy group (e.g., ethoxycarbonyloxy, t-butoxycarbonyloxy, 2-ethyl-1-hexyloxycarbonyloxy), an aryloxycarbonyloxy group (e.g., phenoxycarbonyloxy), a carbamoyloxy group (e.g., N,N-dimethylcarbamoyloxy, N-butylcarbamoyloxy), a sulfamoyloxy group (e.g., N,N-diethylsulfamoyloxy, N-propylsulfamoyloxy), a sulfonyloxy group (e.g., methanesulfonyloxy, benzenesulfonyloxy), a carboxyl group, an acyl group (e.g., acetyl, pivaloyl, benzoyl), an alkoxycarbonyl group (e.g., ethoxycarbonyl), an aryloxycarbonyl group (e.g., phenoxycarbonyl), a carbamoyl group (e.g., N,N-dibutylcarbamoyl, N-ethyl-N-octylcarbamoyl, N-propylcarbamoyl), an amino group (e.g., amino, N-methylamino, N,N-dioctylamino), an anilino group (e.g., N-methylanilino), a heterocyclic amino group (e.g., 4-pyridylamino), an amido group (e.g., acetamido, benzamido), an urethane group e.g., N-hexylurethane, N,N-dibutylurethane), a ureido group (e.g., N,N-dimethylureido, N-phenylureido), a sulfonamido group (e.g., butanesulfonamido, p-toluenesulfonamido), an alkylthio group (e.g., ethylthio, octylthio), an arylthio group (e.g., phenylthio, 4-dodecylphenylthio), a heterocyclicthio group (e.g., 2-benzothiazolylthio, 5-tetrazolylthio), a sulfinyl group (e.g., benzenesulfinyl), a sulfonyl group (e.g., methanesulfonyl, octanesulfonyl, p-toluenesulfonyl), a sulfo group, a cyano group or a nitro group.

X represents hydrogen, a halogen atom (e.g., fluorine, chlorine, bromine), a carboxyl group, a group bonding to the skeleton via an oxygen atom (e.g., acetoxy, benzoyloxy, phenoxy, 4-cyanophenoxy, tolyloxy, 4-methanesulfonylphenoxy, 4-ethoxycarbonylphenoxy, 2-naphthoxy, ethoxy, 2-cyanoethoxy, 2-benzothiazolyloxy), a group bonding to the skeleton via a nitrogen atom (e.g., benzenesulfonamido, heptafluorobutanamido, pentafluorobenzamido, octanesulfonamido, p-cyanophenylureido, 1-piperidinyl, 5,5-dimethyl-2,4-dioxo-3-oxazolidinyl, 1-benzyl-5-ethoxy-3-hydantoinyl, 1-imidazolyl, 1-pyrazolyl, 3-chloro-1-pyrazolyl, 3,5-dimethyl-1,2,4-triazol-1yl, 5- or 6-bromobenzotriazol-1-yl) or a group bonding to the skeleton via a sulfur atom (e.g., phenylthio, 2-butoxy-5-t-octylphenylthio, 4-methanesulfonylphenylthio, 4-dodecyloxyphenylthio, 2-cyanoethylthio, 1-ethoxycarbonyltridecylthio, 2-benzothiazolylthio, 1-phenyl-1,2,3,4-tetrazole-5-thio).

Among the pyrazoloazole magenta couplers of he formulae (M-2) to (M-6), those of the formulae (M-3) and (M-4) are especially preferred.

Specific non-limiting examples of the pyrazoloazole magenta couplers of the formulae (M-2) to (M-6) are given below, which are not intended to limit the present invention.

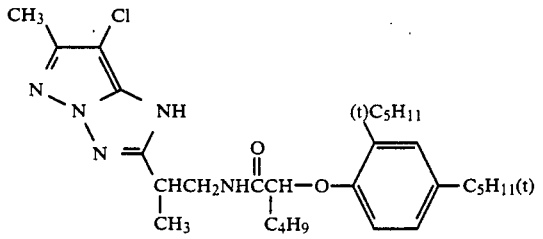

PM-1

-continued
PM-2
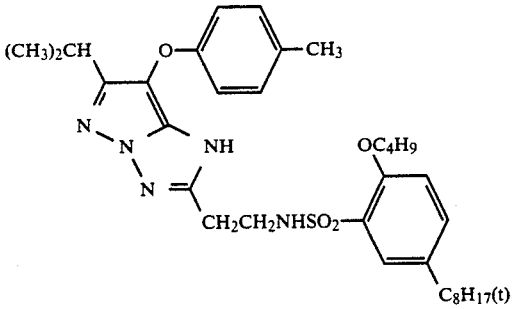
PM-3
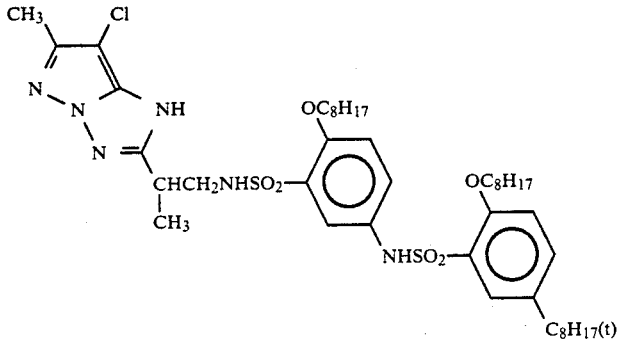
PM-4
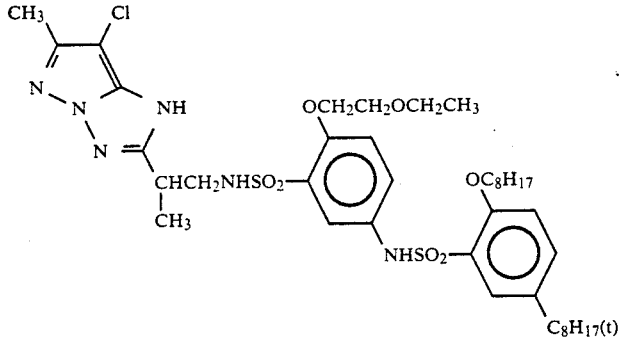
PM-5
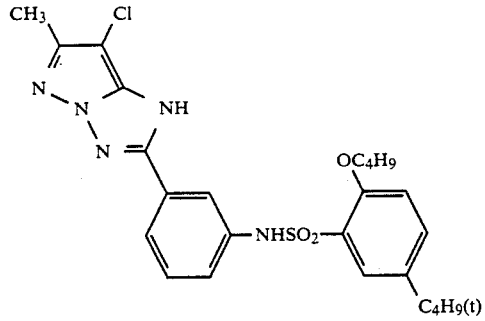
PM-6
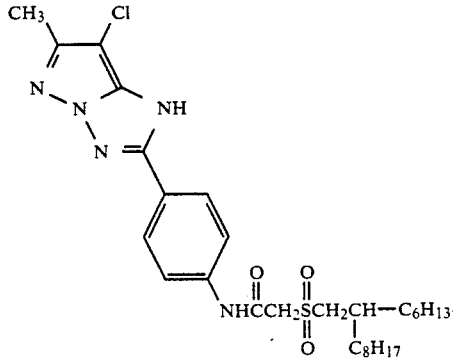

-continued
PM-7
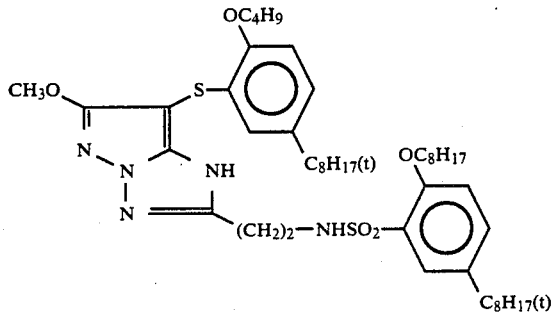
PM-8
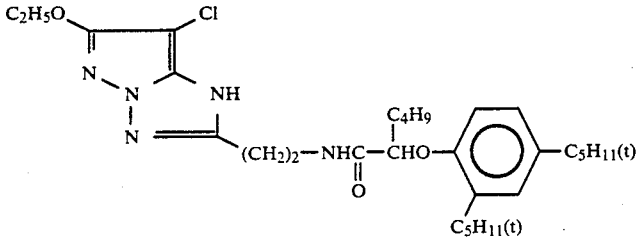
PM-9
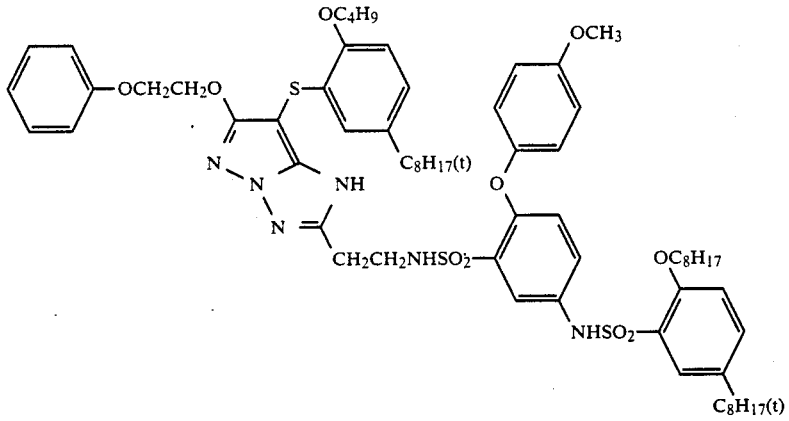
PM-10
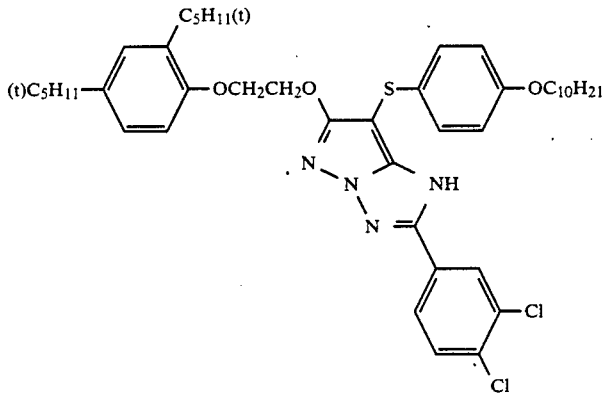

-continued
PM-11
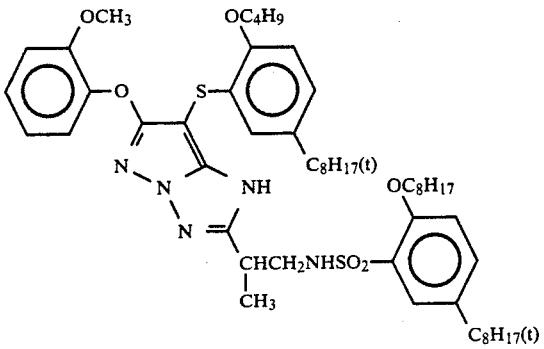
PM-12
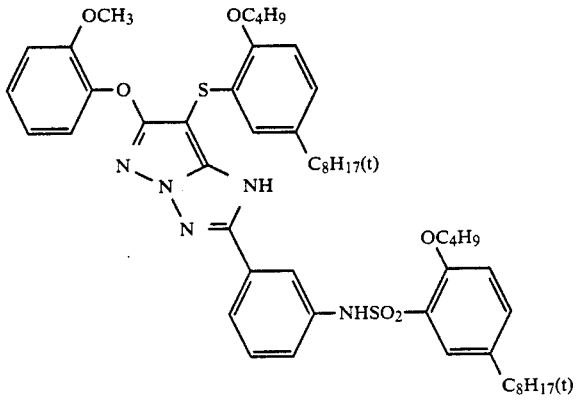
PM-13
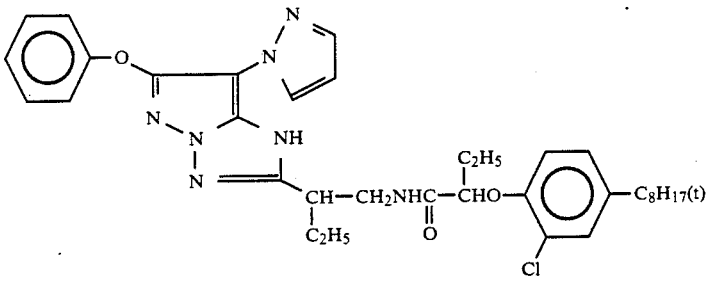
PM-14
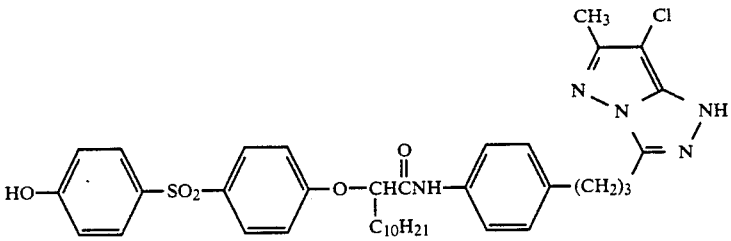
PM-15
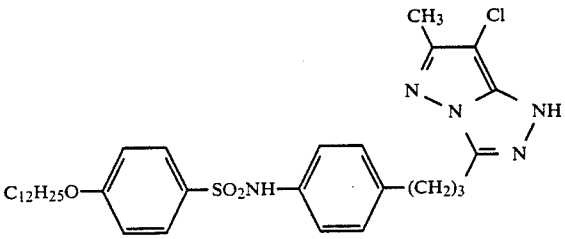

-continued
PM-16
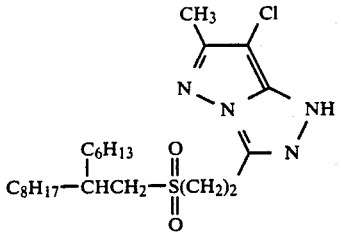
PM-17
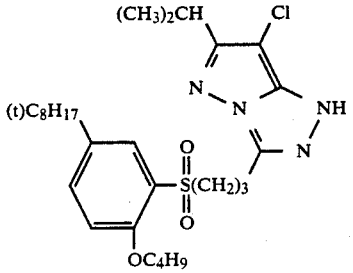
PM-18
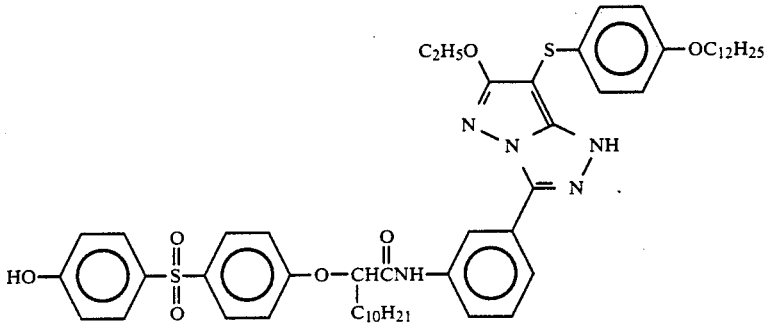
PM-19
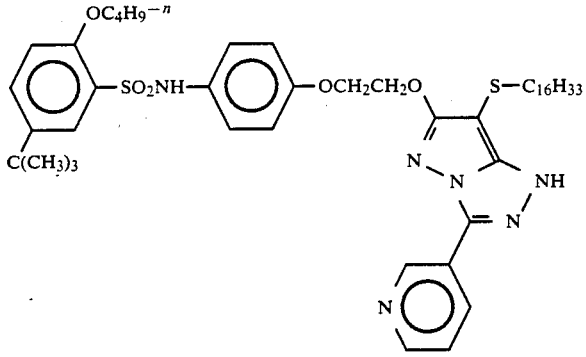
PM-20
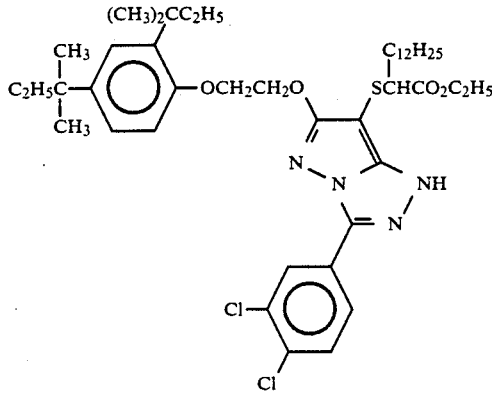

-continued
PM-21
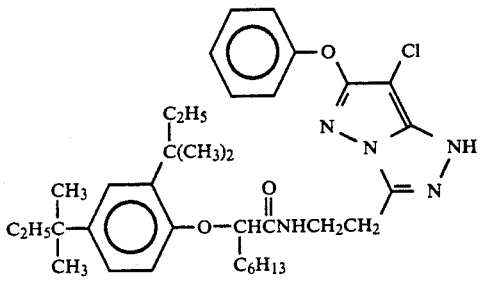
PM-22
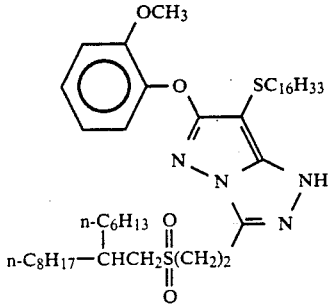
PM-23
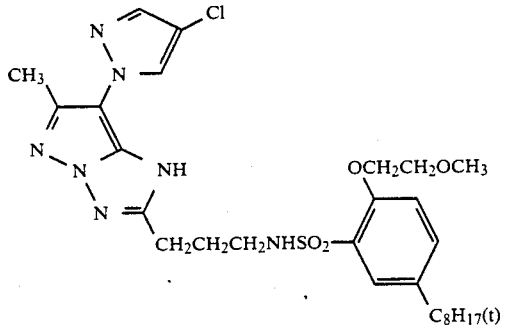
PM-24
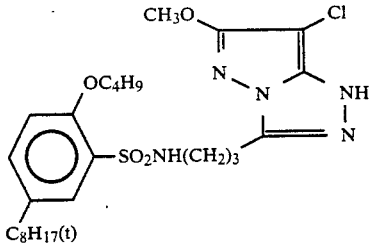
PM-25
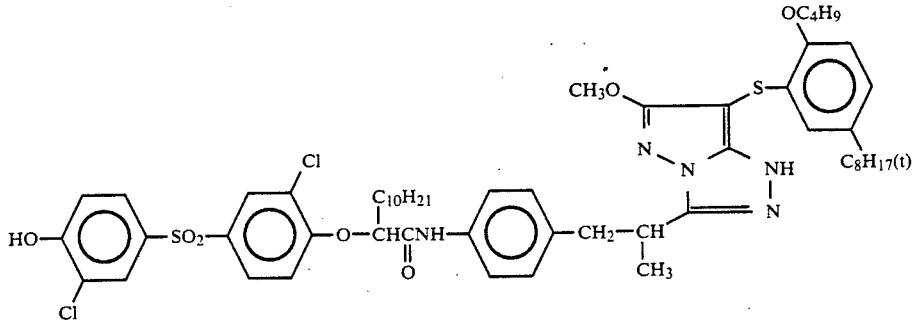

-continued

PM-26

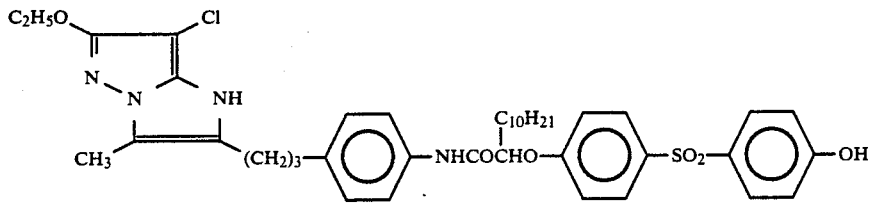

PM-27

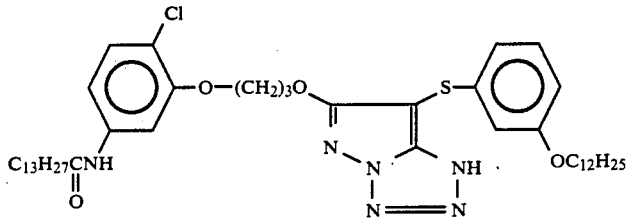

The bleaching solution for use in the present invention contains a (1,3-diaminopropanetetraacetato)iron-(III) complex salt, and the addition amount of the above complex in the solution is at least 0.2 mol/liter. For the purpose of shortening the processing time, the addition amount is preferably at least 0.25 mol/liter, and more preferably at least 0.3 mol/liter. However, too much of the complex interferes with the bleaching reaction, such that the upper limit of the complex in the bleaching solution is 0.5 mol/liter. The (1,3-diaminopropane-tetraacetato)iron(III) complex salt can be used in the form of an ammonium, sodium or potassium salt, and the ammonium salt thereof is most preferred with respect to increased bleaching rate. If the amount of the ( 1,3 -diaminopropanetetraacetato)iron(III) complex salt in the bleaching solution is less than 0.2 mol/liter, the bleaching rate is noticeably reduced and the degree of stain formed in the processed material increases. The content of the complex must be at least 0.2 mol/liter according to the method of the present invention.

Next, the effect of the pH value of the bleaching solution for use in the present invention is described as follows.

A bleaching solution containing a (1,3-diaminopropanetetraacetato)iron(III) complex salt and having a pH value of 6 has been proposed in the above-noted JP-A-62-222252. Hitherto, the pH value of an amino-polycarboxylate/ferric complex-containing bleaching solution has been conventionally set to about 6 from both the aspects of ensuring a sufficient bleaching rate and of preventing recoloring failure of cyan dyes. If the pH value of the bleaching solution is lowered, the bleaching rate would be accelerated, but recoloration of the cyan dyes would be insufficient. Accordingly, the optimum setting of the pH has been said to be about 6.

Contrary to conventional practice, the pH value of the bleaching solution is set at 5.5 or less in accordance with the method of the present invention, whereby the effect of the present invention is attained. Specifically, rapid desilvering and complete recoloration of cyan dyes is attained by the method of the present invention, and the above-noted conflicting problem in the prior art is thus overcome by the present invention. Particularly, the pH value of the bleaching solution for use in the method of the present invention is from 5.5 to 2.5. The preferred pH range which more effectively expresses the effect of the present invention is from 5.0 to 3.0, and more preferably from 4.5 to 3.5. For adjusting the pH range, an organic acid such as acetic acid, citric acid or malonic acid or an inorganic acid such as hydrochloric acid, sulfuric acid, nitric acid or phosphoric acid can be used. In particular, acids having an acid dissociation constant (pKa) of from 2.5 to 5.5 are preferred as having a buffering property in the pH range of the present invention. Such acids include, for example, the above-noted acetic acid, citric acid and malonic acid, and additionally benzoic acid, formic acid, butyric acid, malic acid, tartaric acid, oxalic acid, propionic acid, phthalic acid and the like organic acids. Acetic acid is most preferred among them.

The amount of the acid to be used for adjusting the pH is preferably from 0.5 to 2.5 mols, and more preferably from 0.75 to 2.0 mols, per mol of the bleaching solution.

The bleaching solution preferably contains 1,3-diaminopropane-tetraacetic acid in an amount somewhat greater than the amount necessary for complex formation with ferric ion. Generally, the content of the 1,3-diaminopropane-tetraacetic acid in the bleaching solution is preferably in excess within the range of from 1 to 10 mol %.

The bleaching solution for use in the present invention can contain amino-polycarboxylate/ferric complexes other than a (1,3-diaminopropanetetraacetato)iron(III) complex salt, or in addition to the (1,3-diaminopropanetetraacetato)iron(III) complex salt. Such additional complexes include, for example, ferric complexes of ethylenediaminetetraacetates, diethylene triaminepentaacetates and cyclohexanediaminetetraacetates.

The bleaching solution for use in the present invention may contain various bleaching accelerators.

Bleaching accelerators for use in the method of the present invention include, for example, the mercapto group- or disulfido group-containing compounds described in U.S. Pat. No. 893,858, West German Patent 1,290,812, British Patent 1,138,842, JP-A-53 95630 and *Research Disclosure,* Item No. 17129 (July, 1978); the thiazolidine derivatives as described in JP-A 50-140129; the thiourea derivatives as described in U.S. Pat. No. 3,706,561; iodides described in JP-A 58-16235; the polyethyleneoxides as described in West German Patent 2,748,430; and the polyamine compounds as described in JP-B-45-8836. (The term "JP-B" as used herein means an "examined Japanese patent publication".) The mercapto compounds described in British Patent 1,138,842 are especially preferred.

The bleaching solution for use in the present invention may contain, in addition to the bleaching agent and the above-described compounds, a re-halogenating agent, for example, bromides such as potassium bromide, sodium bromide or ammonium bromide, or chlorides such as potassium chloride, sodium chloride or ammonium chloride. The concentration of the rehalogenating agent in the solution is from 0.1 to 5 mols/liter, and preferably from 0.5 to 3 mols/liter.

In addition, the bleaching solution preferably contains ammonium nitrate as a metal corrosion inhibitor.

According to the method of the present invention, the amount of the bleaching solution that is replenished is from 50 ml to 2000 ml, and preferably from 100 ml to 1000 ml, per $m^2$ of the photographic material processed.

In actual photographic processing with the bleaching solution of the present invention, the solution is aerated so as to oxidize the 1,3-diaminopropane-tetraacetato/ferrous complex salt formed therein.

After bleaching, the photographic material is successively fixed. The fixing agents for use in the fixing step include thiosulfates such as sodium thiosulfate, ammonium thiosulfate, ammonium sodium thiosulfate and potassium thiosulfate, and thiocyanates such as sodium thiocyanate, ammonium thiocyanate and potassium thiocyanate.

Above all, ammonium thiosulfate is preferably used, and the amount of the agent in the fixing solution is from 0.3 to 3 mols/liter, and preferably from 0.5 to 2 mols/liter.

The amount of thiocyanates to be added to the fixing solution is from 0.01 to 3 mols/liter, but it is preferably from 0.05 to 2 mols/liter in order to accelerate the fixing rate.

In addition, one or more compounds of the above-described formulae (I) to (V) are added to the fixing solution, alone or in combination. The amount of the compound(s) of formulae (I) to (V) to be added varies depending on the type of compounds selected, but is generally from 0.2 to 100 g/liter, and preferably from 0.5 to 30 g/liter.

The fixing solution can contain, as a preservative, sulfites such as sodium sulfite, potassium sulfite or ammonium sulfite, as well as hydroxylamine, hydrazine or aldehyde/sulfite adducts such as acetaldehyde/sodium sulfite adduct. In addition, it may further contain various brightening agents, anti-foaming agents and surfactants as well as organic solvents such as polyvinyl pyrrolidone or methanol. In particular, the sulfinic acid compounds described in JP-A-62-143048 are preferred as preservatives.

According to the method of the present invention, the amount of the fixing agent that is replenished is preferably from 300 ml to 3000 ml, and more preferably from 300 ml to 1000 ml, per $m^2$ of the photographic material processed.

The fixing solution for use in the present invention preferably contains various amino-polycarboxylic acids and organic phosphonic acids for the purpose of stabilizing the fixing solution.

The total of the time for the desilvering step, including bleaching and fixing or a combined bleach/fixing step, in the method of the present invention is preferably shortened such that the effect of the present invention is attained more advantageously. The preferred time for the desilvering step is from 1 to 4 minutes, and more preferably from 1 minute and 30 seconds to 3 minutes. The processing temperature is from 25° C. to 50° C., and preferably from 35° C. to 45° C. In the preferred temperature range, the desilvering rate is improved, and generation of stains in the processed material is effectively inhibited.

In the desilvering step of the present invention, the baths are stirred as much as possible in order to attain the effect of the present invention more efficiently.

A specific means for enhancing stirring in the processing steps of the present invention include a method of running a jet stream of the processing solution against the emulsion surface of the photographic material being processed as described in JP-A-62-183460 and JP-A-62-183461; a method of using a rotary means so as to elevate the stirring effect as described in JP-A-62-183461; a method of moving the photographic material being processed while keeping a wiper blade, as provided in the processing bath, in contact with the emulsion surface of the material, whereby the flow of the processing solution over the emulsion surface is made turbulent to improve the stirring effect; and a method of increasing the circulating flow of the total processing solution. Such stirring enhancement means are effective in anyone of the bleaching bath, bleach-fixing bath and fixing bath. The enhancement of stirring is thought to accelerate the rate of applying the bleaching agent and fixing agent to the emulsion film of the photographic material being processed, with a resulting acceleration of the desilvering speed.

The above-noted stirring enhancement means are more effective when a bleaching accelerator is added to the processing solution. Accordingly, the acceleration effect is extremely enhanced and the fixation inhibiting action of the bleaching accelerator is retarded.

The automatic developing machine for use for carrying out the method of the present invention preferably has a photographic material-conveying means as described in JP-A-60-191257, JP-A 60-191258 and JP-A-60-191259. As described in JP-A-60 191257, the conveying means has a noticeable advantage in that the amount of the carry-over of the processing solution to the next bath is extremely reduced such that deterioration of the processing solution is prevented. Such an advantageous effect is especially convenient for shortening the processing time in the respective processing steps and for reducing the amount of the replenisher of the processing solution.

The effect of the present invention becomes more noticeable as the total processing time (i.e., developing, bleaching and fixing) is shortened. Particularly, the effect is noticeable when the total processing time is 8 minutes or less. When the time is 7 minutes or less, the superiority of the method of the present invention to the conventional processing method is pronounced. Accordingly, in practice of the method of the present invention, the total processing time is preferably 8 minutes or less, and more preferably 7 minutes or less.

The color developer for use in the present invention contains a known aromatic primary amine color-developing agent. Preferred examples of the developing agents for use in the present invention are given below, which, however, are not intended to limit the present invention.

D-1: N,N-diethyl-p-phenylenediamine
D-2: 2-Amino-5-diethylaminotoluene
D-3: 2-Amino-5-(N-ethyl-N-laurylamino)toluene
D-4: 4-[N-ethyl-N-(β-hydroxyethyl)amino]aniline
D-5: 2-Methyl-4-[N-ethyl-N-(β-hydroxyethyl-)amino]-aniline D-6: 4-Amino-3-methyl N-ethylN-[8-(methanesulfonamido)-ethyl]-aniline D-7: N-(2-Amino-5-diethylaminophenylethyl) methanesulfonamide D-8: N,N-Dimethyl-p-phenylenediamine D-9: 4-Amino-3-methyl-N-ethyl-N-methoxyethylaniline D-10: 4-Amino-3-methyl-N-ethyl-N-β-ethoxyethylaniline D-11: 4-Amino-3-methyl-N-ethyl-N-β-butoxyethylaniline Among the above-mentioned p-phenylenediamine derivatives, D-5 is especially preferred.

These p-phenylenediamine derivatives may be in the form of salts such as sulfates, hydrochlorides, sulfites or p toluenesulfonates. The amount of the aromatic primary amine developing agent to be contained in the developer is preferably from about 0.1 g/liter to about 20 g/liter, more preferably from about 0.5 g/liter to about 10 g/liter.

The color developer may contain, as a preservative, sulfites such as sodium sulfite, potassium sulfite, sodium bisulfite, potassium bisulfite, sodium metasulfite or potassium metasulfite, as well as carbonyl-sulfite adducts, if desired.

The preferred amount of the preservative to be added to the color developer is from 0.5 to 10 g/liter, and more preferably from 1 to 5 g/liter.

Compounds capable of directly preserving the above mentioned color developing agents are preferably added to the agents, and such compounds include, for example, various hydroxylamines, and hydroxamic acids as described in JP-A-63-43138, hydrazines and hydrazides as described in U.S. Pat. No. 4,801,521, phenols as described in JP-A-63-44657, and JP-A-63-58443, α-hydroxyketones and α-aminoketones as described in JP-A-63-44656 and/or various saccharides as described in JP-A-63-36244. Further, monoamides are preferably added as described in JP-A-63-4235, JP-A-63-24254, JP-A-63-21647, JP-A-63-146040, JP-A-63-27841, and JP-A 63-25654, diamines as described in JP-A-63-30845, JP-A-63-146040, and JP-A-63-43139, polyamines as described in JP-A-63-21647 and JP-A-63-26655, polyamines as described in JP-A-63-44655, nitroxy radicals as described in JP A-63-53551, alcohols described in JP-A-63-43140 and JP-A-53549, oximes as described in JP-A 63-56654, and tertiary amines as described in EP 266797A2, to the color developer for use in the present invention, in combination with the abovementioned preservative compounds.

Other preservatives which can optionally be added to the color developer for use in the present invention include, for example, various kinds of metals as described in JP-A-57-44148, and JP-A-57-53749, salicylic acids as described in JP-A-59-180588, alkanolamines as described in JP-A-54-3532, polyethyleneimines as described in JP-A-56-94349, and aromatic polyhydroxy compounds as described in U.S. Pat. No. 3,746,544. In particular, the addition of aromatic polyhydroxy compounds is preferred.

The color developer for use in the present invention preferably has a pH value of from 9 to 12, and more preferably from 9 to 11.0. The color developer can contain other various known compounds which constitute conventional developers.

In order to maintain the above pH range, buffers are preferably used.

Specific examples of buffers for use in adjusting the pH of the color developer include, for example, sodium carbonate, potassium carbonate, sodium bicarbonate, potassium bicarbonate, trisodium phosphate, tripotassium phosphate, disodium phosphate, dipotassium phosphate, sodium borate, potassium. borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicyrate) and potassium 5-sulfo-2-hydroxybenzoate (potassium 5-sulfosalicylate). However, these examples are not whatsoever limiting.

The amount of the buffer to be added to the color developer is preferably 0.1 mol/liter or more, and more preferably from 0.1 mol/liter to 0.4 mol/liter.

In addition, the color developer can contain various chelating agents for preventing the precipitation of calcium or magnesium or for the purpose of improving the stability of the color developer.

The chelating agent are preferably organic compounds, and include, for example, aminopolycarboxylic acids, organic phosphonic acids and phosphonocarboxylic acids. Specific non-limiting examples of the compounds are given below as follows.

Nitrilotriacetic acid, diethylenetriamine-pentaacetic acid, ethylenediamine-tetraacetic acid, N,N,N-trimethylenephosphonic acid, ethylenediamine-N,N,N',N'-tetramethylenephosphonic acid, trans-cyclohexanedraminetetraacetic acid, 1,2-diaminopropane-tetraacetic acid, hydroxyethyliminodiacetic acid, glycolether-diaminetetraacetic acid, ethylenediamine-orthohydroxyphenylacetic acid, 2-phosphonobutane-1,2,4-tricarboxylic acid, 1-hydroxyethylidene-1,1-diphosphonic acid, N,N[-bis(2-hydroxybenzyl)ethylenediamine]-N,N'-diacetic acid.

These chelating agents can be used in combination of two or more, if desired.

The amount of the chelating agent to be added is such that it is sufficient to sequester the metal ion in the color developer. For example, it is from about 0.1 to 10 g/liter.

The color developer can contain, if desired, conventional development accelerators. However, it is preferred that the color developer for use in the present invention does not substantially contain benzyl alcohol with regard to environmental factors, easy preparation of the color developer and prevention of color staining in the processed photographic material. The terminology "does not substantially contain benzyl alcohol" as referred to herein means that the color developer contains benzyl alcohol in an amount of 2 ml/liter or less, but preferably does not contain any benzyl alcohol.

Other development accelerators which can be used in the present invention include, for example, thioether compounds as described in JP-B-37-16088, JP-B-37-5987, JP-B-38-7826, JP-B-44-12380, JP-B-45-9019 and U.S. Pat. No. 3,813,247; p-phenylenediamine compounds as described in JP-A-52-49829 and JP-A-50-15554; quaternary ammonium salts as described in JP-A-50-137726, JP-B-44-30074, JP-A-56-156826 and JP-A-52-43429; amine compounds as described in U.S. Pat. Nos. 2,494,903, 3,128,182, 4,230,796, 3,253,919, JP-B-41-11431, U.S. Pat. Nos. 2,482,546, 2,596,926 and 3,582,346; polyalkyleneoxides as described in JP-B-37-16088, JP-B-42-25201, U.S. Pat. No. 3,128,183, JP-B-41-11431, JP-B-42-23883 and U.S. Pat. No. 3,532,501; as well as other 1-phenyl-3-pyrazolidones and imidazoles.

In the present invention, conventional antifoggants can be added to the color developer, if desired. For example, alkali metal halides such as sodium chloride, potassium chloride or potassium iodide as well as organic antifoggants can be used. Specific examples of useful organic antifoggants include nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolylbenzimidazole, 2-thiazolylmethylbenzimidazole, indazole, hydroxyazaindene and adenine.

The color developer for use in the present invention may contain a brightening agent. The brightening agent is preferably a 4,4'-diamino-2,2'-disulfostilbene compound. The amount of the brightening agent to be added to the color developer is to not exceed 5 g/liter, and is preferably from 0.1 to 4 g/liter.

In addition, the color developer may further contain, if desired, various surfactants such as alkylsulfonic acids, arylphoaphonic acids, aliphatic carboxylic acids and aromatic carboxylic acids.

The processing temperature using the color developer of the present invention is between 20° C. and 50° C., and preferably between 30° C. and 45° C. The developing time is between 20 seconds and 5 minutes, and preferably between 30 seconds and 3 minutes. The amount of the replenisher for the color developer in accordance with the method of the present invention is preferably reduced. Specifically, the replenisher amount is from 0 to 1500 ml, and preferably from 100 to 800 ml, per $m^2$ of the photographic material processed; more preferably, it is from 100 to 400 ml/$m^2$.

The color developing system may comprise two or more baths, if desired, and the color developer replenisher is added to the first bath or to the last bath, whereby the development time is shortened or the replenisher amount is reduced respectively.

The processing method of the present invention can be applied to color reversal processing. As such, a black-and-white first developer is generally used in the conventional color reversal procedure for color photographic materials. A conventional black-and-white developer for use in processing conventional monochromatic (black-and white) photographic materials can also be employed as the black-and-white developer. The developer can contain various well-known additives which are generally added to conventional black-and-white developers.

Specific examples of usable additives include, for example, a developing agent such as 1-phenyl-3-pyrazolidone, Metol or hydroquinone, a preservative such as a sulfite, an alkali accelerator such as sodium hydroxide, sodium carbonate or potassium carbonate, an inorganic or organic inhibitor such as potassium bromide, 2-methylbenzimidazole or methylbenzothiazole, a water softener such as a polyphosphate, as well as a development inhibitor comprising a trace amount of iodides or mercapto compounds.

The processing method of the present invention comprises the above-described steps of color-development, bleaching, bleach-fixation and fixation. After the bleach-fixing or fixing step, the photographic material is generally rinsed in water or is stabilized. A simplified process may be employed where the photographic material as processed in the bath having a fixability is directly stabilized without substantial rinsing in water.

The rinsing water for use in the rinsing step may contain known additives, if desired. For example, useful additives include a water softeners such as inorganic phosphoric acids, aminopolycarboxylic acids and organic phosphoric acids, a bactericide or fungicide for preventing the propagation of various bacteria and algae (for example, isothiazolone, organic chlorine-containing bactericides and benzotriazole), and a surfactant for preventing drying load and unevenness. In addition, the compounds described in L. E. West *Water Quality Criteria, Phot. Sci. & Eng.*, Vol. 9, No. 6, pages 344 to 359 (1965) can also be used.

As the stabilizing solution for the stabilizing step, a processing solution for stabilizing the formed color image is used. For instance, a solution having a buffering capacity in the range of from pH 3 to pH 6 or an aldehyde (e.g., formalin)-containing solution can be used. The stabilizing solution may contain, if desired, an ammonium compound, a metal (e.g., Bi, Al) compound, a brightening agent, a chelating agent (e.g., 1-hydroxyethylidene-1,1-diphosphonic acid), a bactericide, a fungicide, a hardening agent and a surfactant.

The rinsing step or stabilizing step is preferably effected in a multi-stage countercurrent system, and the number of the stages is preferably from 2 to 4 stages. The amount of the replenisher to the system is from 1 to 50 times, preferably from 2 to 30 times, and more preferably from 2 to 15 times, of the amount of the carry-over from the previous bath per the unit area of the photographic material processed.

The water for use in the water-rinsing step or stabilizing step includes, for example, city water as well as de-ionized water which has been treated with an ion exchange resin to minimize the Ca and Mg contents to 5 mg/liter or less, or sterilized water which has been treated with a halogen or ultraviolet sterilizer lamp is preferably used.

When the method of the present invention is practiced using an automatic developing machine for continuous processing, the processing solution is often evaporated and thereby concentrated during the continuous procedure. Concentration of the processing solution is especially pronounced when the amount of the processing solution is small or the area of the processing solution open to the ambient is large. In order to compensate for the concentration of the processing solution during the continuous procedure, an appropriate amount of water or a replenisher to the processing system is preferably added.

The over-flown solution from the water rinsing step or the stabilizing step is preferably returned to the previous bath having a fixing ability, whereby the amount of the waste liquid is reduced.

The photographic material to be processed by the method of the present invention optionally has at least one blue-sensitive, green-sensitive and red-sensitive silver halide emulsion layer on a support, and the number of the silver halide emulsion layers and light-insensitive layers and the order of the layer(s) provided on the support are not restricted. For example, the silver halide photographic material may comprise at least one light-sensitive layer comprising plural silver halide emulsion layers each having substantially the same color-sensitivity, but having a different degree of light sensitivity, provided on a support. Such a light-sensitive layer is a unit color-sensitive layer having a color-sensitivity to any of blue, green, or red light. In a multilayer silver halide color photographic material, in general, the sequence of the unit light-sensitive layers provided on the support comprises a red sensitive layer, a green-sensitive layer and a blue-sensitive layer, where the blue-sensitive layer is furthest from the support. However, this sequence may be reversed, as the case may be, or a different sequence where a different light-sensitive layer is sandwiched between the same color-sensitive layers may also be employed.

Light-insensitive layers including various interlayers can be provided between the silver halide light-sensitive layers or over the outermost layer or below the lowermost layer.

The interlayers can contain various couplers or DIR compounds as described in JP-A-61-43748, JP-A-59-113438, JP-A-59 113440, JP-A-61-20037 and JP-A-61-20038, or may also contain conventional color mixing preventing agents.

The plural silver halide emulsion layers constituting each unit light-sensitive layer preferably has a two-layer structure comprising a high sensitivity emulsion layer and a low-sensitivity emulsion layer, as described in West German Patent 1,121,470 or British Patent 923,045. In general, the plural layers are preferably sequenced on the support in such order that the layer closest to the support has a lower degree of sensitivity. A light-insensitive layer may be placed between the respective silver halide emulsion layers. Alternatively, the low-sensitivity emulsion layer of the unit light-sensitive layer may be provided further from the support and the high-sensitivity emulsion layer closer to the support, as described in JP-A-57-112751, JP-A-62-200350, JP-A-62-206541 and JP-A-62-206543.

Examples of the ordering sequence of the layers on the support include a low-sensitivity blue-sensitive layer (BL)/high-sensitivity blue-sensitive layer (BH)/high-sensitivity green-sensitive layer (GH)/low-sensitivity green-sensitive layer (GL)/high-sensitivity red-sensitive layer (RH)/low-sensitivity red-sensitive layer (RL), where the BL layer is furthest from the support, the order of BH/BL/GL/GH/RH/RL and the order of BH/BL/GH/GL/RL/RH.

Further, the order of blue-sensitive layer/GH/RH/GL/RL where the blue-sensitive layer is furthest from the support, as described in JP-B-55-34932, can also be employed. The order of blue-sensitive layer/GL/RL/GH/RH where the blue-sensitive layer is furthest from the support, as described in JP-A-56-25738 and JP-A-62-63936, can also be employed.

In addition, the ordering sequence described in JP-B-49-15495, where the upper layer is a silver halide emulsion layer of highest sensitivity, the middle layer is a silver halide emulsion layer of intermediate sensitivity, and the lower emulsion layer is of lowest sensitivity, wherein the three layers are provided on the support such that the layer having the lowest sensitivity is closest to the support, can also be employed. A three layer-constitution having the same color-sensitivity may be sequenced on the support in the order of middle-sensitivity emulsion layer/high-sensitivity emulsion layer/-low-sensitivity emulsion layer, where the middle-sensitivity layer is furthest from the support, as described in JP-A-59-202464.

As described above, various layer constitutions and ordering sequences may be selected for preparing the photographic material in accordance with the objects thereof.

The preferred silver halides for use in the photographic emulsion layer in the photographic material processed in accordance with the method of the present invention is silver iodobromide, silver iodochloride or silver iodochlorobromide containing about 30 mol % or less silver iodide. More preferably, the silver halide is silver iodobromide or silver iodochlorobromide containing from about 2 mol % to about 25 mol % of silver iodide.

The silver halide grains in the photographic emulsion may have a regular crystal form such as cubic, octahedral or tetradecahedral, or have an irregular crystal form such as spherical or tabular, or have crystal defects such as twin planes, or may comprise composite crystal forms.

The silver halide grains may comprise fine grains having a grain size of about 0.2 μm or less, or may be large grains having a grain size of up to about 0 μm. The emulsion may be either a polydispersed emulsion or a monodispersed emulsion.

The silver halide photographic emulsion for use in the present invention can be prepared, for example, by the methods described in *Research Disclosure* (RD), Item No. 17643 (December, 1978), pages 22 to 23, I. *Emulsion Preparation and Types; RD* Item No. 18716 (November, 1979), page 648; P. Glafkides, *Chimie et Phisique Photographique* (published by Paul Montel, 1967), G. F. Duffin, *Photographic Emulsion Chemistry* (published by Focal Press, 1966) and V. L. Zelikman et al, *Making and Coating Photographic Emulsion* (published by Focal Press, 1964).

The monodispersed emulsions described in U.S. Pat. Nos. 3,574,628 and 3,655,394 and British Patent 1,413,748 are also preferred for use in the present invention.

Tabular grains having an aspect ratio of about 5 or more can also be used in the present invention. Such tabular grains are readily prepared in accordance with the methods described in Gutoff, *Photographic Science and Engineering*, Vol. 14, pages 248 to 257 (1970), U.S. Pat. Nos. 4,434,226, 4,414,310, 4,433,048 and 4,439,520 and British Patent 2,112,157.

The crystal structure of the grains may be uniform or may comprise halogen compositions which differ between the inside and the outside portions of the grain. Further, the grains may have a layered structure. Other silver halide grain structures for use in the present invention include plural silver halides joined together by an epitaxial junction. The grains may also contain compounds other than silver halides, such as silver rhodanide or lead oxide.

In addition, a mixture of grains of various crystal form may also be used.

The silver halide emulsions for use in the present invention are generally physically-ripened, chemically-ripened or spectrally sensitized. Additives for use in the ripening or sensitizing steps are described, for example, in RD (Research Disclosure), Item Nos. 17643 and 18716, and relevant parts thereof are listed in the Table below.

Other known photographic additives for use in the present invention are also described, for example, in the above Research Disclosures, and relevant parts thereof are also included in the Table.

| Kind of Additives | RD 17643 | RD 18716 |
|---|---|---|
| 1. Chemical Sensitizer | Page 23 | Page 648, right column |
| 2. Sensitivity-enhancer | | Page 648, right column |
| 3. Spectral Sensitizer, Supersensitizer | Pages 23 to 24 | Page 648, right column to page |

-continued

| Kind of Additives | RD 17643 | RD 18716 |
|---|---|---|
| | | 649, right column |
| 4. Brightening Agent | Page 24 | |
| 5. Antifoggant and Stabilizer | Pages 24 to 25 | Page 649, right column |
| 6. Light Absorbent, Filter Dye and UV Absorbent | Pages 25 to 26 | Page 649, right column to page 650, left column |
| 7. Stain Inhibitor | Page 25, right column | Page 650, left column to right column |
| 8. Color Image Stabilizer | Page 25 | |
| 9. Hardening Agent | Page 26 | Page 651, left column |
| 10. Binder | Page 26 | Page 651, left column |
| 11. Plasticizer and Lubricant | Page 27 | Page 650, right column |
| 12. Coating Aid and Surfactant | Pages 26 to 27 | Page 650, right column |
| 13. Antistatic Agent | Page 27 | Page 650, right column |

In order to prevent deterioration of the photographic properties by formaldehyde gas, a compound is preferably added to the photographic material which reacts with formaldehyde and immobilize (fix) the same as described in U.S. Pat. Nos. 4,411,987 and 4,435,503.

Various color couplers can be used in the photographic material of the present invention, and examples thereof are described in the patent publication referred to in the above-noted RD, Item No. 17643, VII-C to G.

Yellow couplers preferably used in the material of the present invention include those described in U.S. Pat. Nos. 3,933,501, 4,022,620, 4,326,024, 4,401,752, 4,248,961, JP-B-58-10739, British Patents 1,425,020, 1,476,760, U.S. Pat. Nos. 3,973,968, 4,314,023, 4,511,649 and European Patent 249,473A.

Of the magenta couplers for use in the present invention, 5-pyrazolone compounds are preferred in addition to the above-described pyrazoloazole compounds. Above all, those described in U.S. Pat. Nos. 4,310,619, 4,351,897, European Patent 73,636, U.S. Pat. Nos. 3,061,432, 3,725,064, RD, Item No. 2422 (June, 1984), JP-A-60-33552, RD, Item No. 24230 (June, 1984), JP-A-60-43659, JP-A-61-72238, JP-A-60-35730, JP-A-55-118034, JP-A-60-185951, U.S. Pat. Nos. 4,500,630, 4,540,654, 4,556,630, WO(PCT) 88/04795 are especially preferred.

Cyan couplers for use in the present invention include phenol couplers and naphthol couplers, and those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, 4,327,173, West German Patent (OLS) No. 3,329,729, European Patents 121,365A, 249,453A, U.S. Pat. Nos. 3,446,622, 4,333,999, 4,753,871, 4,451 559, 4,427,767, 4,690,889, 4,254,212, 4,296,199 and JP-A-61-42658 are preferred.

Colored couplers for correcting unnecessary absorption of colored dyes can also be used in the material of the present invention, and those described in *Research Disclosure,* Item No. 17643 VII-G, U.S. Pat. No. 4,163,670,JP-B-57-39413, U.S. Pat. Nos. 4,004,929, 4,138,258 and British Patent 1,146,368 are preferred.

Couplers for forming diffusible dyes can also be used in the material of the present invention, and those described in U.S. Pat. No. 4,366,237, British Patent 2,125,570, European Patent 96,570 and West German Patent 3,234,533 are preferred.

Polymerized dye-forming couplers can also be used in the material of the present invention, and specific examples thereof are described in U.S. Pat. Nos. 3,451,820, 4,080,211, 4,367,282, 4,409,320, 4,576,910 and British Patent 2,102,173.

Couplers which release a photographically useful residue upon coupling are also preferably used in the material of the present invention. As development inhibitor-releasing DIR couplers for use in the material of the present invention, those described in the patent publications referred to in the above-noted *Research Disclosure,* Item No. 17643, VII-F as well as those described in JP-A-57-151944, JP-A-57-154234, JP-A-60-184248, JP-A-63-37346 and U.S. Pat. No. 4,248,962 are preferred.

Of the couplers which imagewise release a nucleating agent or a development accelerator during development, for use in the material of the present invention, those described in British Patents 2,097,140, 2,131,188, JP-A-59-157638 and JP-A-59-170840 are preferred.

In addition, other couplers for use in the photographic materials of the present invention include competing couplers as described in U.S. Pat. No. 4,130,427, poly-valent couplers as described in U.S. Pat. Nos. 4,238,472, 4,338,393 and 4,310,618, DIR redox compound-releasing couplers, DIR coupler-releasing couplers, DIR coupler-releasing redox compounds or DIR redox compound-releasing redox compounds as described in JP-A-60-185950 and JP-A-62-25252, couplers which release dyes which recolor after release as described in European Patent 173,302A, bleaching accelerator-releasing couplers as described in *Research Disclosure,* Item Nos. 11449 and 24241 and JP-A-61-201247, ligand-releasing couplers as described in U.S. Pat. No. 4,553,477 and leuco dye-releasing couplers as described in JP-A-63-75747.

The above-described couplers can be incorporated into the photographic material of the present invention by various known dispersion methods.

For instance, an oil-in-water dispersion method may be thus employed, and examples of high boiling point solvents useful in the oil-in-water dispersion method are described in U.S. Pat. No. 2,322,027.

Specific examples of high boiling point organic solvents having a boiling point at atmospheric pressure of 175° C. or more for use in the oil-in-water dispersion method include phthalates (e.g., dibutyl phthalate, dicyclohexyl phthalate, di-2-ethylhexyl phthalate, decyl phthalate, bis(2,4-di-t-amylphenyl) phthalate, bis(2,4-di-t-amylphenyl) isophthalate, bis(1,1-diethylpropyl) phthalate); phosphates or phosphonates (e.g., triphenyl phosphate, tricresyl phosphate, 2-ethylhexyldiphenyl phosphate, tricyclohexyl phosphate, tri-2-ethylhexyl phosphate, tridecyl phosphate, tributoxyethyl phosphate, trichloropropyl phosphate, di-2-ethylhexylphenyl phosphonate); benzoates (e.g., 2-ethylhexyl benzoate, dodecyl benzoate, 2-ethylhexyl-p-hydroxybenzoate); amides (e.g., N,N-diethyldecanamide, N,N-diethyllaurylamide, N-tetradecylpyrrolidone); alcohols or phenols (e.g., isostearyl alcohol, 2,4-di-tert-amylphenol), aliphatic carboxylic acid esters (e.g., bis(2-ethylhexyl) sebacate, dioctyl azelate, glycerol tributyrate, isostearyl lactate, trioctyl citrate); aniline derivatives (e.g., N,N-dibutyl-2-butoxy-5-tertoctylaniline); and hydrocarbons (e.g., paraffin, dodecylbenzene, diisopropylnaphthalene). As auxiliary solvents, organic solvents having a boiling point of about 30° C. or higher, preferably from 50° C. to about 160° C. are useful. Specific examples thereof include ethyl acetate, butyl acetate, ethyl propionate, methyl ethyl ketone, cyclohexanone, 2-ethoxyethyl acetate and dimethylformamide.

A latex dispersion method can also be employed, and the step and the effect of the method as well as examples of latexes for use in the impregnation step of the latex method are described in U.S. Pat. No. 4,199,363 and West German Patent Application (OLS) Nos. 2,541,274 and 2,541,230.

The method of the present invention can be applied to various color photographic materials. Specific examples include color negative film for general use and for movie applications, color reversal film for slides or television, color papers, color positive films and color reversal papers.

Supports which are suitably used in the material of the present invention include those described in, for example, the above-noted *Research Disclosure,* Item No. 17643, page 28 and *Research Disclosure,* Item No. 18716, from page 647, right-hand column to page 648, left-hand column.

The photographic materials for processing by the method of the present invention are preferably such that the sum of the thickness of each of the hydrophilic colloid layers on the side of the support having the emulsion layers is 28 μm or less, and the film swelling speed ($T_{\frac{1}{2}}$) is 30 seconds or less. The thickness of the layers that measured at a temperature of 25° C. and a relative humidity of 55% (conditioned for 2 days), and the film swelling speed ($T_{\frac{1}{2}}$) is determined by a conventional technical means. For instance, the film swelling speed can be determined by the use of a swellometer of the type described in A. Green, *Photographic Science & Engineering,* Vol. 19, No. 2, pages 124 to 129. In a measurement using a swellometer, the saturated film thickness corresponds to 90% of the maximum swollen film thickness achieved when the material has been processed with a color developer at 30° C. for 3 minutes and 15 seconds, and $T_{\frac{1}{2}}$ is defined to be the time required to achieve the half of the saturated film thickness.

The film swelling speed ($T_{\frac{1}{2}}$) can be adjusted by adding a hardening agent to a gelatin binder, or by varying the condition of storage of the coated material.

The swelling percentage is preferably from 150 to 400%. The swelling percentage is calculated as the (maximum swollen film thickness-film thickness)/(film thickness), using the maximum swollen film thickness determined under the above-noted conditions.

The silver halide color photographic materials for use in the present invention may contain a color developing agent for the purpose of simplifying and accelerating the photographic processing of the materials. For incorporating the agent, various precursors of color developing agents are preferably used. For example, useful precursors include indoaniline compounds as described in U.S. Pat. No. 3,342,597, Schiff base compounds as described in U.S. Pat. No. 3,342,599 and *Research Disclosure,* Item No. 14850 and 15159, aldol compounds as described in *Research Disclosure,* Item No. 13924, metal salt complexes as described in U.S. Pat. No. 3,719,492 and urethane compounds as described in JP-A-53-135628.

The silver halide color photographic materials for use in the present invention can contain, if desired, various 1-phenyl-3-pyrazolidones for accelerating color developability.

Specific examples of such compounds are described in JP-A-56-64339, JP-A-57-144547 and JP-A-58-15438.

The temperature of the processing solutions for use in the method of the present invention, may be elevated to accelerate processing and to shorten the processing time, or on the contrary, the temperature may be lowered to improve the quality of the image formed or to improve the stability of the processing solutions. For the purpose of economizing silver employed in the photographic materials of the present invention, the technique of cobalt intensification or hydrogen peroxide intensification as described in West German Patent 2,226,770 or U.S. Pat. No. 3,674,499 can be employed.

The method of the present invention can further be applied to heat-developable photographic materials as described in U.S. Pat. No. 4,500,626, JP-A-60-133449, JP-A-59-218443, JP-A-61-238056 and European Patent 10,660A2.

The following non-limiting examples illustrate the present invention in detail.

EXAMPLE 1

Plural layers each having the composition mentioned below were provided on a cellulose triacetate film support coated with a subbing layer to prepare a multilayer color photographic material (Sample No. 101).

The compositions of the layers are described below. The amount coated is represented by units of g(silver)/m$^2$ for colloidal silver and silver halide, by units of g/m$^2$ for couplers, additives and gelatin, and by unit of mol per mol of silver halide present in the same layer for the sensitizing dyes. Additives are represented by their abbreviations as given below. Where one additive compound has plural effects, one of these effects is described as a representative.

UV; Ultraviolet Absorbent
Solv; High Boiling Point Organic Solvent
ExF; Dye
ExS; Sensitizing Dye
ExC; Cyan Coupler
ExM; Magenta Coupler
ExY; Yellow Coupler
Cpd; Additive

| | |
|---|---|
| First Layer: Anti-halation Layer | |
| Black Colloidal Silver | 0.15 |
| Gelatin | 2.9 |
| UV-1 | 0.3 |
| UV-2 | 0.06 |
| UV-3 | 0.07 |
| Solv-2 | 0.08 |
| ExF-1 | 0.01 |
| ExF-2 | 0.01 |
| Second Layer: Low-sensitivity Red-sensitive Emulsion Layer | |
| Silver Iodobromide Emulsion (AgI 4 mol %; uniform AgI type; Sphere-corresponding diameter 0.4 μm; fluctuation coefficient of sphere-corresponding diameter 37%; tabular grains; ratio of diameter/thickness 3.0) | 0.4 as Ag |
| Gelatin | 0.8 |
| ExS-1 | $2.3 \times 10^{-4}$ |
| ExS-2 | $1.4 \times 10^{-4}$ |
| ExS-5 | $2.3 \times 10^{-4}$ |
| ExS-7 | $8.0 \times 10^{-6}$ |
| ExC-1 | 0.17 |
| ExC-2 | 0.03 |
| ExC-3 | 0.13 |
| Third Layer: Middle-sensitivity Red-sensitive Emulsion Layer | |

-continued

| | |
|---|---|
| Silver Iodobromide Emulsion (AgI 6 mol %; AgI-rich core type; core/shell grains with core/shell ratio of 2/1; Sphere-corresponding diameter 0.65 μm; fluctuation coefficient of sphere-corresponding diameter 25%; tabular grains; ratio of diameter/thickness 2.0) | 0.65 as Ag |
| Silver Iodobromide Emulsion (AgI 4 mol %; uniform AgI type; Sphere-corresponding diameter 0.4 μm; fluctuation coefficient of sphere-corresponding diameter 37%; tabular grains; ratio of diameter/thickness 3.0) | 0.1 as Ag |
| Gelatin | 1.0 |
| ExS-1 | $2 \times 10^{-4}$ |
| ExS-2 | $1.2 \times 10^{-4}$ |
| ExS-5 | $2 \times 10^{-4}$ |
| ExS-7 | $7 \times 10^{-6}$ |
| ExC-1 | 0.31 |
| ExC-2 | 0.01 |
| ExC-3 | 0.06 |
| Fourth Layer: High-sensitivity Red-sensitive Emulsion Layer | |
| Silver Iodobromide Emulsion (AgI 6 mol %; AgI-rich core type; core/shell ratio of 2/1; Sphere-corresponding diameter 0.7 μm; fluctuation coefficient of sphere-corresponding diameter 25%; tabular grains; ratio of diameter/thickness 2.5) | 0.9 as Ag |
| Gelatin | 0.8 |
| ExS-1 | $1.6 \times 10^{-4}$ |
| ExS-2 | $1.6 \times 10^{-4}$ |
| ExS-5 | $1.6 \times 10^{-4}$ |
| ExS-7 | $6 \times 10^{-4}$ |
| ExC-1 | 0.07 |
| ExC-4 | 0.05 |
| Solv-1 | 0.07 |
| Solv-2 | 0.20 |
| Cpd-7 | $4.6 \times 10^{-4}$ |
| Fifth Layer: Interlayer | |
| Gelatin | 0.6 |
| UV-4 | 0.03 |
| UV-5 | 0.04 |
| Cpd-1 | 0.1 |
| Polyethyl Acrylate Latex | 0.08 |
| Solv-1 | 0.05 |
| Sixth Layer: Low-sensitivity Green-sensitive Emulsion Layer | |
| Silver Iodobromide Emulsion (AgI 4 mol %; uniform AgI type; Sphere-corresponding diameter 0.4 μm; fluctuation coefficient of sphere-corresponding diameter 37%; tabular grains; ratio of diameter/thickness 2.0) | 0.18 as Ag |
| Gelatin | 0.4 |
| ExS-3 | $2 \times 10^{-4}$ |
| ExS-4 | $7 \times 10^{-4}$ |
| ExS-5 | $1 \times 10^{-4}$ |
| ExM-5 | 0.11 |
| ExM-7 | 0.03 |
| ExY-8 | 0.01 |
| Solv-1 | 0.09 |
| Solv-4 | 0.01 |
| Seventh Layer: Intermediate-sensitivity Green-sensitive Emulsion Layer | |
| Silver Iodobromide Emulsion (AgI 4 mol %; AgI-rich shell type with core/shell ratio of 1/1; sphere-corresponding diameter 0.5 μm; fluctuation coefficient of sphere-corresponding diameter 20%; tabular grains; ratio of diameter/thickness 4.0) | 0.27 as Ag |
| Gelatin | 0.6 |
| ExS-3 | $2 \times 10^{-4}$ |
| ExS-4 | $7 \times 10^{-4}$ |

-continued

| | |
|---|---|
| ExS-5 | $1 \times 10^{-4}$ |
| ExM-5 | 0.17 |
| ExM-7 | 0.04 |
| ExY-8 | 0.02 |
| Solv-1 | 0.14 |
| Solv-4 | 0.02 |
| Eighth Layer: High-sensitivity Green-sensitive Emulsion Layer | |
| Silver Iodobromide Emulsion (AgI 8.7 mol %; multi-layered grains with silver ratio of 3/4/2; AgI content ratio of 24 mol %/0 mol %/3 mol % in order from the inside core; sphere-corresponding diameter 0.7 μm; fluctuation coefficient of sphere-corresponding diameter 25%; tabular grains; ratio of diameter/thickness 1.6) | 0.7 as Ag |
| Gelatin | 0.8 |
| ExS-4 | $5.2 \times 10^{-4}$ |
| ExS-5 | $1 \times 10^{-4}$ |
| ExS-8 | $0.3 \times 10^{-4}$ |
| ExM-5 | 0.1 |
| ExM-6 | 0.03 |
| ExY-8 | 0.02 |
| ExC-1 | 0.02 |
| ExC-4 | 0.01 |
| Solv-1 | 0.25 |
| Solv-2 | 0.06 |
| Solv-4 | 0.01 |
| Cpd-7 | $1 \times 10^{-4}$ |
| Ninth Layer: Interlayer | |
| Gelatin | 0.6 |
| Cpd-1 | 0.04 |
| Polyethyl Acrylate Latex | 0.12 |
| Solv-1 | 0.02 |
| Tenth Layer: Interlayer Effect Donor Layer to Red-sensitive Layer | |
| Silver Iodobromide Emulsion (AgI 6 mol %; AgI-rich core type with core/shell ratio of 2/1; sphere-corresponding diameter 0.7 μm; fluctuation coefficient of sphere-corresponding diameter 25%; tabular grains; ratio of diameter/thickness 2.0) | 0.68 as Ag |
| Silver Iodobromide Emulsion (AgI 4 mol %; uniform AgI type; Sphere-corresponding diameter 0.4 μm; fluctuation coefficient of sphere-corresponding diameter 37%; tabular grains; ratio of diameter/thickness 3.0) | 0.19 as Ag |
| Gelatin | 1.0 |
| ExS-3 | $6 \times 10^{-4}$ |
| ExM-10 | 0.19 |
| Solv-1 | 0.20 |
| Eleventh Layer: Yellow Filter Layer | |
| Yellow Colloidal Silver | 0.06 |
| Gelatin | 0.8 |
| Cpd-2 | 0.13 |
| Solv-1 | 0.13 |
| Cpd-1 | 0.07 |
| Cpd-6 | 0.002 |
| H-1 | 0.13 |
| Twelfth Layer: Low-sensitivity Blue-sensitive Emulsion Layer | |
| Silver Iodobromide Emulsion (AgI 4.5 mol %; uniform AgI type; Sphere-corresponding diameter 0.7 μm; fluctuation coefficient of sphere-corresponding diameter 15%; tabular grains; ratio of diameter/thickness 7.0) | 0.3 as Ag |
| Silver Iodobromide Emulsion (AgI 3 mol %; uniform AgI type; Sphere-corresponding diameter 0.3 μm; fluctuation coefficient of sphere-corresponding diameter 30%; tabular grains; ratio of diameter/thickness 7.0) | 0.15 as Ag |

-continued

| | |
|---|---|
| Gelatin | 1.8 |
| ExS-6 | $9 \times 10^{-4}$ |
| ExC-1 | 0.06 |
| ExC-4 | 0.03 |
| ExY-9 | 0.14 |
| ExY-11 | 0.89 |
| Solv-1 | 0.42 |
| Thirteenth Layer: Interlayer | |
| Gelatin | 0.7 |
| ExY-12 | 0.20 |
| Solv-1 | 0.34 |
| Fourteenth Layer: High-sensitivity Blue-sensitive Emulsion Layer | |
| Silver Iodobromide Emulsion (AgI 10 mol %; AgI-rich core type; Sphere-corresponding diameter 1.0 μm; fluctuation coefficient of sphere-corresponding diameter 25%; multi-layer twin-plane tabular grains; ratio of diameter/thickness 2.0) | 0.5 as Ag |
| Gelatin | 0.5 |
| ExS-6 | $1 \times 10^{-4}$ |
| ExY-9 | 0.01 |
| ExY-11 | 0.20 |
| ExC-1 | 0.02 |
| Solv-1 | 0.10 |

-continued

| | |
|---|---|
| Fifteenth Layer: First Protective Layer | |
| Fine Silver Iodobromide Grain Emulsion (AgI 2 mol %; uniform AgI type; sphere-corresponding diameter 0.07 μm) | 0.12 as Ag |
| Gelatin | 0.9 |
| UV-4 | 0.11 |
| UV-5 | 0.16 |
| Solv-5 | 0.02 |
| H-1 | 0.13 |
| Cpd-5 | 0.10 |
| Polyethyl acrylate Latex | 0.09 |
| Sixteenth Layer: Second Protective Layer | |
| Fine Silver Iodobromide Grain Emulsion (AgI 2 mol %; uniform AgI type; sphere-corresponding diameter 0.07 μm) | 0.36 as Ag |
| Gelatin | 0.55 |
| Polymethyl Methacrylate Grains (diameter 1.5 μm) | 0.2 |
| H-1 | 0.17 |

Emulsion stabilizer (Cpd-3) (0.07 g/m$^2$) and surfactant (Cpd-4) (0.03 g/m$^2$) were added as coating aids to the first to sixteenth layers, in addition to the above-mentioned components.

The compounds listed above are described below as follows:

UV-1

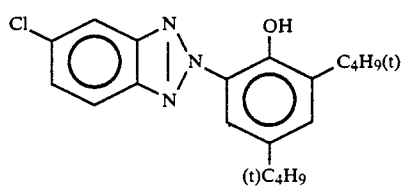

UV-2

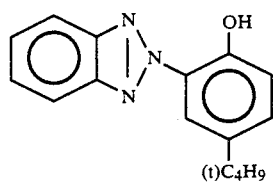

UV-3

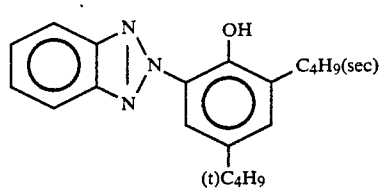

UV-4

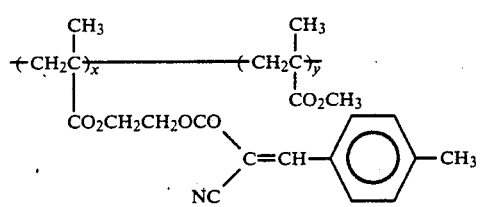

x:y = 70:30 (wt. %)

UV-5

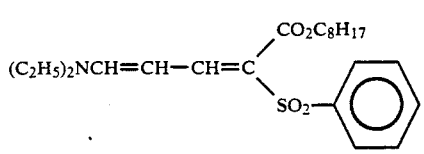

Tricresyl Phosphate — Solv-1

Dibutyl Phthalate — Solv-2

-continued
Solve-4
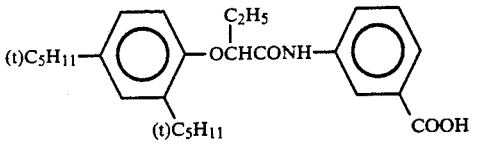
Trihexyl Phosphate
Solv-5
ExF-1
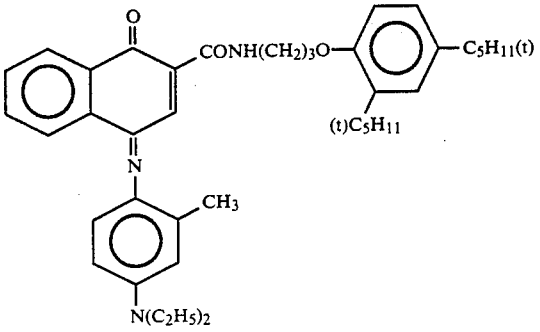
ExF-2
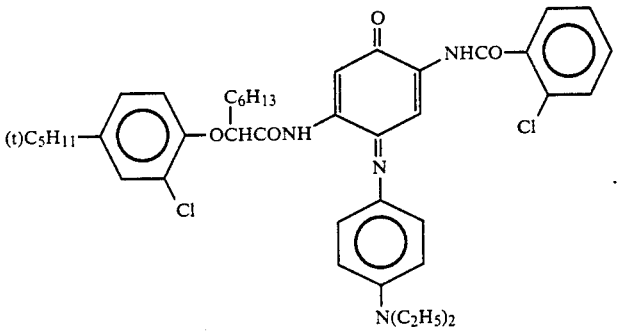
ExS-1
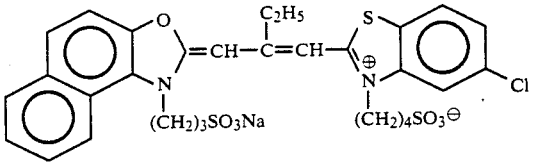
ExS-2
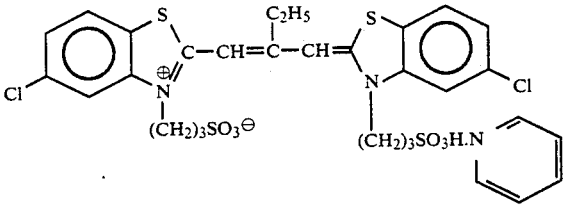
ExS-3
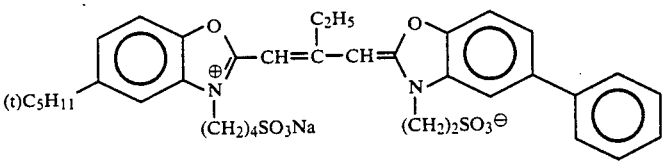
ExS-4
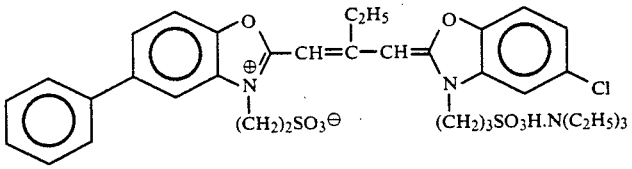

-continued
ExS-5
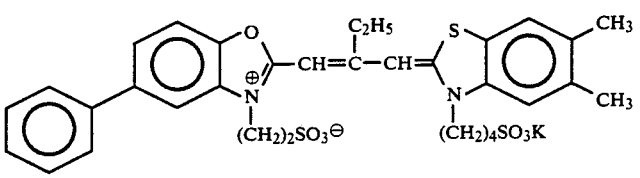
ExS-6
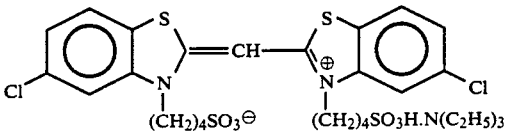
ExS-7
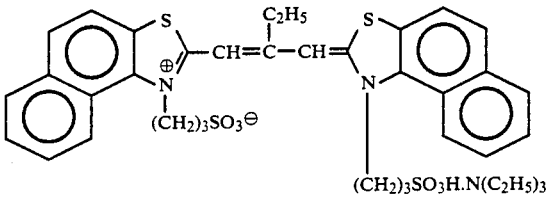
ExS-8
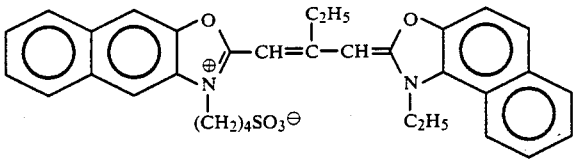
ExC-1
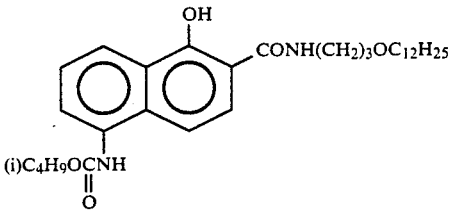
ExC-2
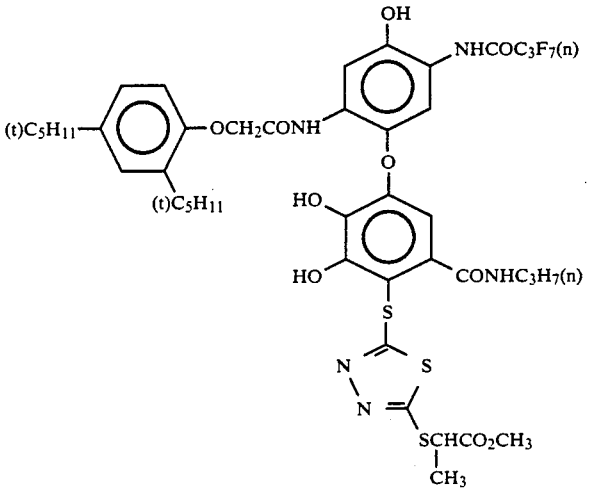

-continued
ExC-3
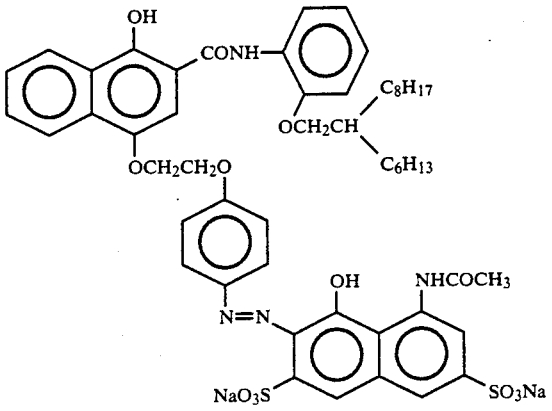
ExC-4
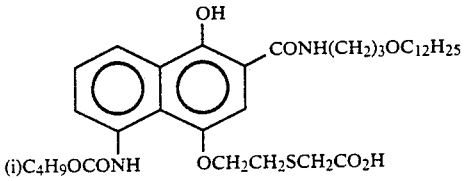
FxM-5
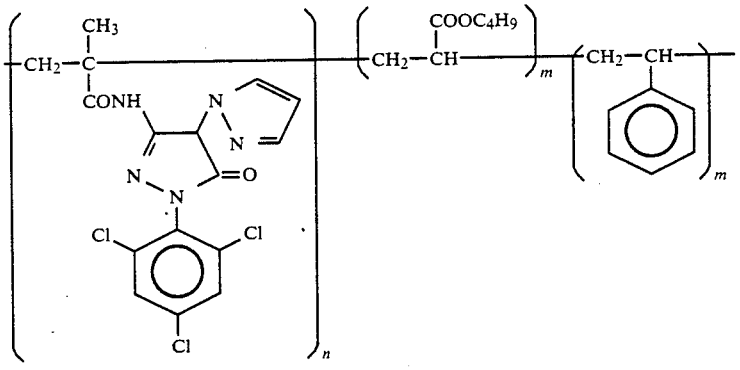
n = 50
m = 25
m' = 25 (by mol)
mol. wt. ca. 20,000
FxM-6
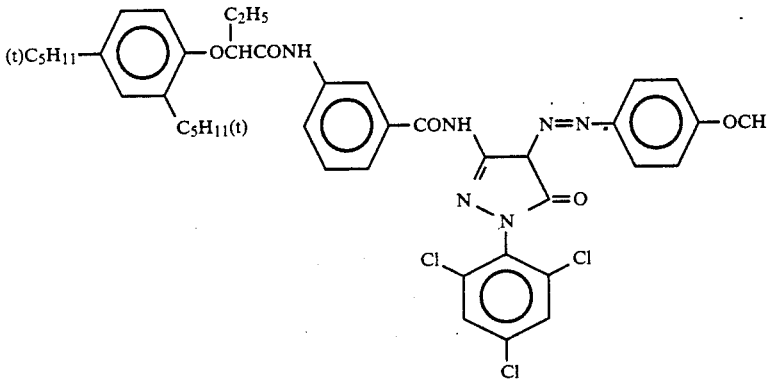

-continued
ExM-7
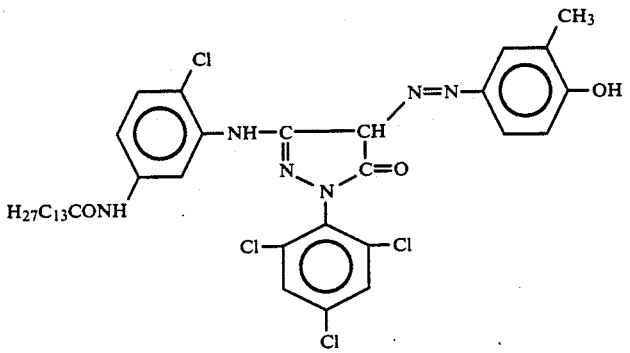
ExM-10
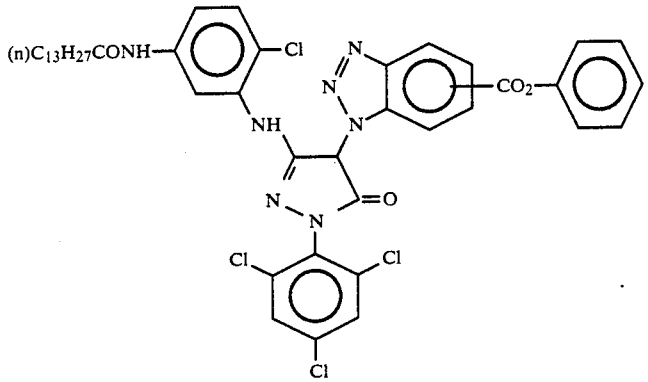
ExY-8
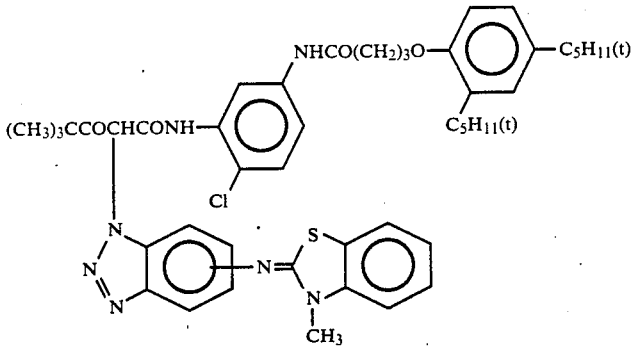
ExY-9
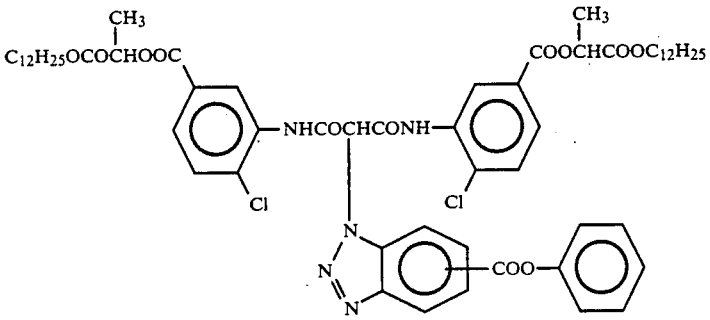

-continued
ExY-11
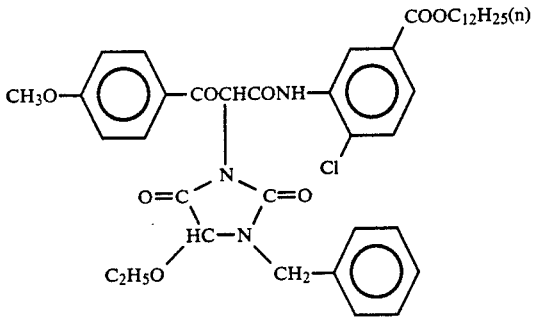
ExY-12
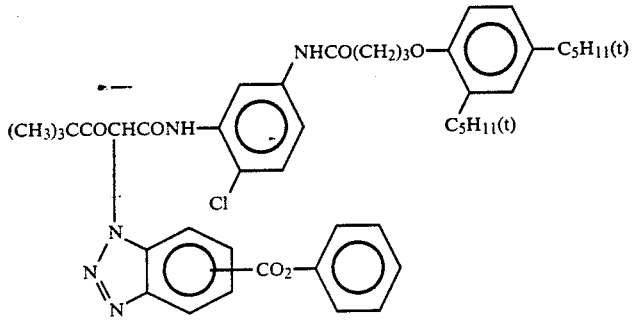
Cpd-7
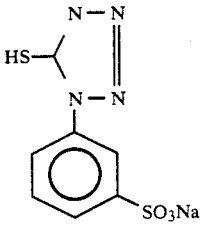
Cpd-1
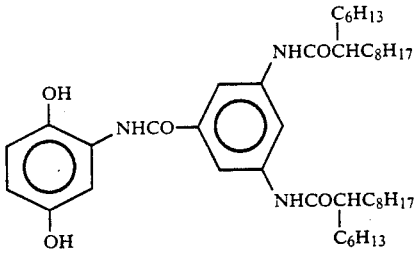
Cpd-2
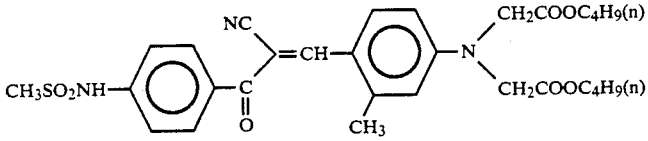
Cpd-6
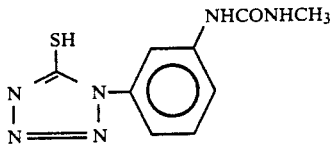
Cpd-5
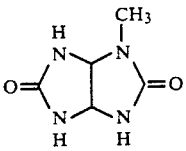

-continued

Cpd-3

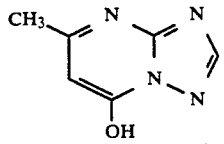

Cpd-4

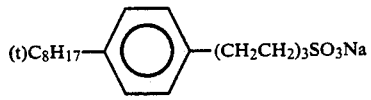

H-1

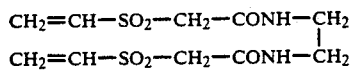

The sample thus prepared was cut into a film strip of 35 mm width and was set into a camera and exposed in a standard manner. Afterwards, the thus exposed sample was continuously processed in accordance with the procedure described in Table 1 below, whereupon the process was continued until the replenisher amount to the fixing bath became twice the total tank capacity (running test). In every running test, the fixing accelerator as indicated in Table 2 below was added to the fixing solution. (In comparative examples, no fixing accelerator was added.)

TABLE 1

Photographic Processing Steps

| Step | Processing Temp. | Time | Amount of Replenisher* | Tank Capacity |
|---|---|---|---|---|
| Color Development | 37.8° C. | 3 min 15 sec | 21 ml | 5 liters |
| Bleaching | 38.0° C. | 45 sec | 4.5 ml | 2 liters |
| Fixation (1) | 38.0° C. | 35 sec | (2-tank counter-current system from (2) to (1)) | 2 liters |
| Fixation (2) | 38.0° C. | 35 sec | 30 ml | 2 liters |
| Stabilization (1) | 38.0° C. | 20 sec | (3-tank counter-current system | 1 liter |
| Stabilization (2) | 38.0° C. | 20 sec | from (3) to (2) to (1)) | 1 liter |
| Stabilization (3) | 38.0° C. | 20 sec | 35 ml | 1 liter |
| Drying | 55° C. | 1 min 00 sec | | |

*Amount of Replenisher: per m of sample having a 35 mm width.

The automatic developing machine used for processing the samples was equipped with a jet stream-stirring means as described in JP-A-62-183460 (page 3), and the process was effected using a jet stream of the fixing solution directed to the emulsion surface of the sample.

The processing solutions used in the above-described steps were as follows:

| | Mother Solution (g) | Replenisher (g) |
|---|---|---|
| Color Developer: | | |
| Diethylenetriaminepentaacetic acid | 5.0 | 6.0 |
| Sodium sulfite | 4.0 | 5.0 |
| Potassium carbonate | 30.0 | 37.0 |
| Potassium Bromide | 1.3 | 0.5 |
| Potassium iodide | 1.2 mg | — |
| Hydroxylamine sulfate | 2.0 | 3.6 |
| 4-(N-ethyl-N-β-hydroxyethyl-amino)-2-methylaniline sulfate | 4.7 | 6.2 |
| Water to make | 1.0 l | 1.0 l |
| pH | 10.00 | 10.15 |
| Bleaching Solution: | | |
| 1,3-Diaminopropanetetra-acetato/ferric complex | 130 | 190 |
| 1,3-Diaminopropanetetraacetic acid | 3.0 | 4.0 |
| Ammonium bromide | 85 | 120 |
| Acetic acid | 50 | 70 |
| Ammonium acetate | 30 | 40 |
| Water to make | 1.0 l | 1.0 l |
| pH (adjusted with acetic acid and ammonia) | 4.3 | 3.5 |
| Fixing Solution: | | |
| 1-Hydroxyethylidene-1,1-diphosphonic acid | 5.0 | 7.0 |
| Disodium Ethylenediaminetetra-acetate | 0.5 | 0.7 |
| Sodium sulfite | 10.0 | 12.0 |
| Sodium bisulfite | 8.0 | 10.0 |
| Ammonium thiosulfate (aqueous solution 700 g/liter) | 170.0 ml | 200.0 ml |
| Ammonium rhodanide | 100.0 | 150.0 |
| Fixing accelerator (see Table 2) | | |
| Water to make | 1.0 l | 1.0 l |
| pH (adjusted with acetic acid and ammonia) | 6.5 | 6.7 |

Stabilizing Solution: Mother solution and replenisher were same.

| | |
|---|---|
| Formalin (37%) | 1.2 ml |
| 5-Chloro-2-methyl-4-isothiazolin-3-one | 6.0 mg |
| 2-Methyl-4-isothiazolin-3-one | 3.0 mg |
| Surfactant ($C_{10}H_{21}$—O—$(CH_2CH_2O)_{10}H$) | 0.4 g |
| Ethylene glycol | 1.0 g |
| Water to make | 1.0 l |
| pH | 5.0 to 7.0 |

The amount of the silver remaining in the processed samples was measured when the processing solutions were fresh (i.e., before the start of the running test) and once again at the completion of the running test (i.e., when the amount of replenisher to the fixing bath became twice the tank volume), and the desilvering efficiency of the process was thus evaluated. The amount of the silver in the sample was measured by fluorescent X-ray analysis. Immediately following the running test, the fixing bath was visually inspected for the formation of precipitates therein. The results are shown in Table 2.

TABLE 2

| Process No. | Fixing Accelerator | AG Remaining ($\mu g/m^2$) Before Running Test | AG Remaining ($\mu g/m^2$) After Running Test | Precipitation | Remarks |
|---|---|---|---|---|---|
| 1 | — | 5.7 | 21.5 | No | Comparative Sample |
| 2 | — | 2.3 | 18.9 | Yes | Comparative Sample |
| 3 | — | 1.9 | 17.8 | " | Comparative Sample |
| 4 | 1* | 1.0 | 1.2 | No | Sample of the Invention |
| 5 | 5* | 1.3 | 1.4 | " | Sample of the Invention |
| 6 | 28* | 1.2 | 1.4 | " | Sample of the Invention |
| 7 | 32** | 1.6 | 1.9 | " | Sample of the Invention |
| 8 | 43* | 1.7 | 2.0 | " | Sample of the Invention |
| 9 | 46** | 1.5 | 1.8 | " | Sample of the Invention |
| 10 | 50* | 1.2 | 1.7 | " | Sample of the Invention |
| 11 | 53* | 1.4 | 1.8 | " | Sample of the Invention |
| 12 | 91** | 1.4 | 1.9 | " | Sample of the Invention |
| 13 | 108** | 1.8 | 2.1 | " | Sample of the Invention |

*Amount Added: $3 \times 10^{-2}$ mol/liter (both to mother solution and to replenisher)
**Amount Added: $1 \times 10^{-3}$ mol/liter (both to mother solution and to replenisher)

It is clear from the above-described results, that the desilvering rate was considerably accelerated in the sample of the present invention as compared to the comparative samples, and the effect was maintained even at the end of the running test. Specifically, using a 2-stage counter-current fixation step of 35 seconds per stage, the residual silver in samples processed using the method of the present invention (i.e., a fixation accelerator of the present invention) was considerably reduced as compared to these samples processed in the absence of the accelerator in fresh fixation solution. The difference in the silver removal rate becomes pronounced at the end of the running test (i.e., once an amount of material had been processed such that the replenisher amount became twice the fixation tank volume). In addition, it is noted that precipitates were not formed in the fixing bath after the running procedure, using the method of the present invention.

EXAMPLE 2

Plural layers each having the composition mentioned below were provided on a cellulose triacetate film support coated with a subbing layer to prepare a multilayer color photographic material (Sample No. 201).

The compositions of the layers are described below.

The amount coated is represented by units of g(silver)/$m^2$ for colloidal silver and silver halide, by units of g/$m^2$ for couplers, additives and gelatin, and by units of mol per mol of silver halide present in the same layer for the sensitizing dyes.

| | |
|---|---|
| First Layer: Anti-halation Layer | |
| Black Colloidal Silver | 0.2 |
| Gelatin | 1.3 |
| ExM-8' | 0.06 |
| UV-1' | 0.1 |
| UV-2' | 0.2 |
| Solv-1' | 0.01 |
| Solv-1' | 0.01 |
| Second Layer: Interlayer | |
| Fine Silver Bromide Grains (Mean grain size 0.07 $\mu$m) | 0.10 |
| Gelatin | 1.5 |
| UV-1' | 0.06 |
| UV-2' | 0.03 |
| ExC-2' | 0.02 |
| ExF-1' | 0.004 |
| Solv-1' | 0.1 |
| Solv-2' | 0.09 |
| Third Layer: First Red-sensitive Emulsion Layer | |
| Silver Iodobromide Emulsion (AgI 2 mol %; AgI-rich core type; sphere-corresponding diameter 0.3 $\mu$m; fluctuation coefficient of sphere-corresponding diameter 29%; normal crystal/twin crystal composite grains; ratio of diameter/thickness 2.5) | 0.4 as Ag |
| Gelatin | 0.6 |
| ExS-1' | $1.0 \times 10^{-4}$ |
| ExS-2' | $3.0 \times 10^{-4}$ |
| ExS-3' | $1 \times 10^{-5}$ |
| ExC-3' | 0.06 |
| ExC-4' | 0.06 |
| ExC-7' | 0.04 |
| ExC-2' | 0.03 |
| Solv-1' | 0.03 |
| Solv-3' | 0.012 |
| Fourth Layer: Second Red-sensitive Emulsion Layer | |
| Silver Iodobromide Emulsion (AgI 5 mol %; AgI-rich core type; sphere-corresponding diameter 0.7 $\mu$m; fluctuation coefficient of sphere-corresponding diameter 25%; normal crystal/twin crystal composite grains; ratio of diameter/thickness 4) | 0.7 as Ag |
| Gelatin | 0.5 |
| ExS-1' | $1 \times 10^{-4}$ |
| ExS-2' | $3 \times 10^{-4}$ |
| ExS-3' | $1 \times 10^{-5}$ |
| ExC-3' | 0.24 |
| ExC-4' | 0.24 |
| ExC-7' | 0.04 |
| ExC-2' | 0.04 |
| Solv-1' | 0.15 |
| Solv 3' | 0.02 |
| Fifth Layer: Third Red-sensitive Emulsion Layer | |
| Silver Iodobromide Emulsion (AgI 10 mol %; AgI-rich core type; sphere-corresponding diameter 0.8 $\mu$m; fluctuation coefficient of sphere-corresponding diameter 16%; normal crystal/twin crystal composite grains; ratio of diameter/thickness 1.3) | 1.0 as Ag |
| Gelatin | 1.0 |
| ExS-1' | $1 \times 10^{-4}$ |
| ExS-2' | $3 \times 10^{-4}$ |
| ExS-3' | $1 \times 10^{-5}$ |
| ExC-5' | 0.05 |
| ExC-6' | 0.1 |
| Solv-1' | 0.01 |
| Solv-2' | 0.05 |
| Sixth Layer: Interlayer | |
| Gelatin | 1.0 |
| Cpd-1' | 0.03 |
| Solv-1' | 0.05 |
| Seventh Layer: First Green-sensitive Emulsion Layer | |
| Silver Iodobromide Emulsion (AgI 2 mol %; AgI-rich core type; sphere-corresponding diameter 0.3 $\mu$m; | 0.30 as Ag |

-continued

| | |
|---|---|
| fluctuation coefficient of sphere-corresponding diameter 28%; normal crystal/twin crystal composite grains; ratio of diameter/thickness 2.5) | |
| ExS-4' | $5 \times 10^{-4}$ |
| ExS-6' | $0.3 \times 10^{-4}$ |
| ExS-5' | $2 \times 10^{-4}$ |
| Gelatin | 1.0 |
| ExM-9' | 0.2 |
| ExY-14' | 0.03 |
| ExM-8' | 0.03 |
| Solv-1' | 0.5 |
| Eighth Layer: Second Green-sensitive Emulsion Layer | |
| Silver Iodobromide Emulsion (AgI 4 mol %; AgI-rich core type; sphere-corresponding diameter 0.6 μm; fluctuation coefficient of sphere-corresponding diameter 38%; normal crystal/twin crystal composite grains; ratio of diameter/thickness 4) | 0.4 as Ag |
| Gelatin | 0.5 |
| ExS-4' | $5 \times 10^{-4}$ |
| ExS-5' | $2 \times 10^{-4}$ |
| ExS-6' | $0.3 \times 10^{-4}$ |
| ExM-9' | 0.25 |
| ExM-8' | 0.03 |
| ExM-10' | 0.015 |
| ExY-14' | 0.01 |
| Solv-1' | 0.2 |
| Ninth Layer: Third Green-sensitive Emulsion Layer | |
| Silver Iodobromide Emulsion (AgI 6 mol %; AgI-rich core type; sphere-corresponding diameter 1.0 μm; fluctuation coefficient of sphere-corresponding diameter 80%; normal crystal/twin crystal composite grains; ratio of diameter/thickness 1.2) | 0.85 as Ag |
| Gelatin | 1.0 |
| ExS-7' | $3.5 \times 10^{-4}$ |
| ExS-8' | $1.4 \times 10^{-4}$ |
| ExM-11' | 0.01 |
| ExM-12' | 0.03 |
| ExM-13' | 0.20 |
| ExM-8' | 0.02 |
| ExY-15' | 0.02 |
| Solv-1' | 0.20 |
| Solv 2' | 0.05 |
| Tenth Layer: Yellow Filter Layer | |
| Gelatin | 1.2 |

-continued

| | |
|---|---|
| Yellow Colloidal Silver | 0.08 |
| Cpd-2' | 0.1 |
| Solv-1' | 0.3 |
| Eleventh Layer: First Blue-sensitive Emulsion Layer | |
| Silver Iodobromide Emulsion (AgI 4 mol %; AgI-rich core type; sphere-corresponding diameter 0.5 μm; fluctuation coefficient of sphere-corresponding diameter 15%; octahedral grains) | 0.4 as Ag |
| Gelatin | 1.0 |
| ExS-9' | $2 \times 10^{-4}$ |
| ExY-16' | 0.9 |
| ExY-14' | 0.07 |
| Solv-1' | 0.2 |
| Twelfth Layer: Second Blue-sensitive Emulsion Layer | |
| Silver Iodobromide Emulsion (AgI 10 mol %; AgI-rich core type; sphere-corresponding diameter 1.3 μm; fluctuation coefficient of sphere-corresponding diameter 25%; normal crystal/twin crystal composite grains; ratio of diameter/thickness 4.5) | 0.5 as Ag |
| Gelatin | 0.6 |
| ExS-9' | $1 \times 10^{-4}$ |
| ExY-16' | 0.25 |
| Solv-1' | 0.07 |
| Thirteenth Layer: First Protective Layer | |
| Gelatin | 0.8 |
| UV-1' | 0.1 |
| UV-2' | 0.2 |
| Solv-1' | 0.01 |
| Solv-2' | 0.01 |
| Fourteenth Layer: Second Protective Layer | |
| Fine Silver Bromide Grains (mean grain size 0.07 μm) | 0.5 |
| Gelatin | 0.45 |
| Polymethyl Methacrylate Grains (diameter 1.5 μm) | 0.2 |
| H-1' | 0.4 |
| Cpd-3' | 0.5 |
| Cpd-4' | 0.5 |

The same surfactant as Example 1 was added to each layer as a coating aid, in addition to the above-mentioned components. The sample thus prepared was called Sample No. 201.

Chemical Structural formulae or chemical names of the compounds listed above are given below.

UV-1'

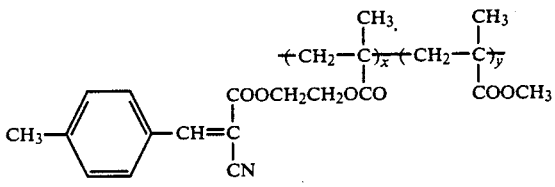

x/y = 7/3 (by weight)

UV-2'

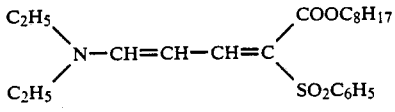

| | |
|---|---|
| Tricresyl Phospate | Solv-1' |
| Dibutyl Phthalate | Solv-2' |
| Bis(2-ethylhexyl) Phthalate | Solv-3' |

-continued
ExM-8'
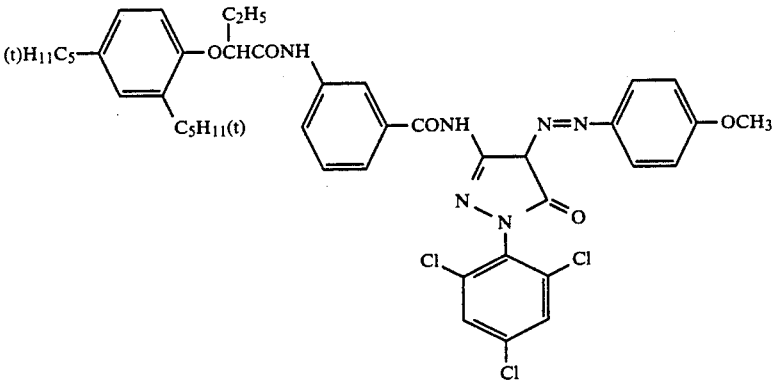
ExF-1'
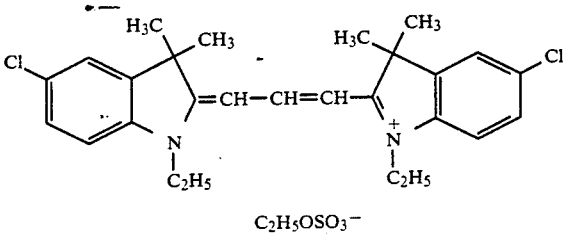
ExC-2'
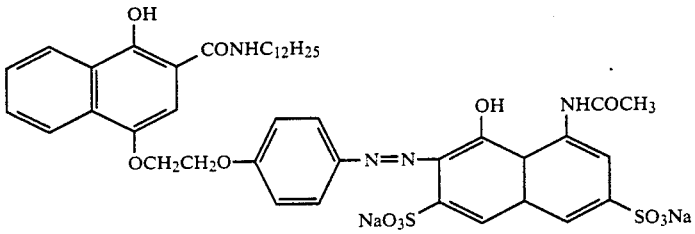
ExC-3'
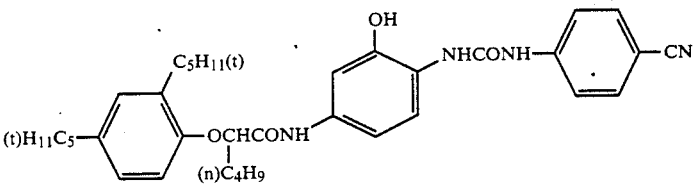
ExC-4'
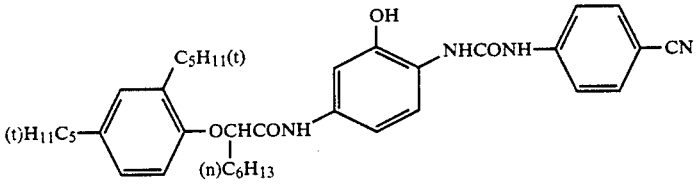
ExY-14'
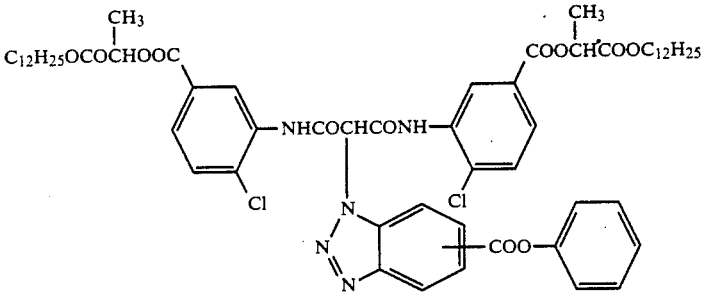

-continued
ExY-15'
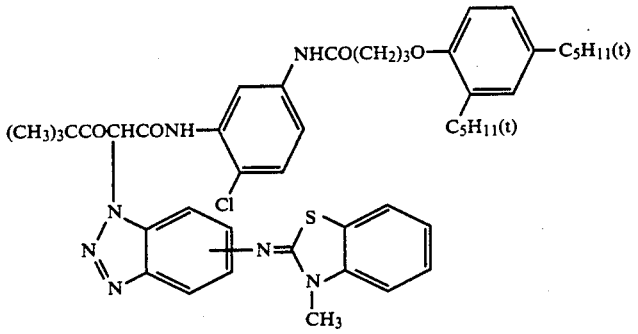
ExC-5'
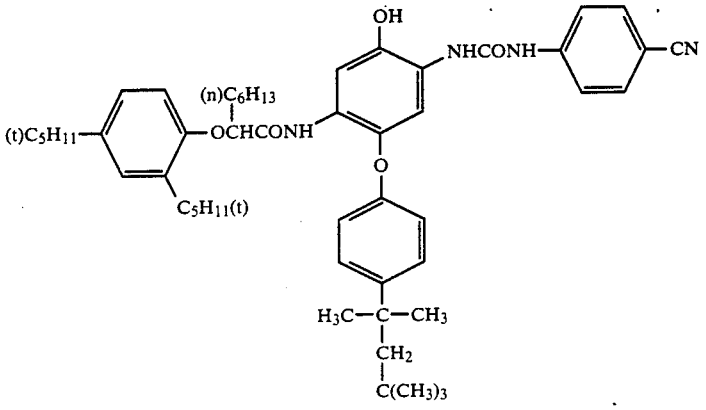
ExC-6'
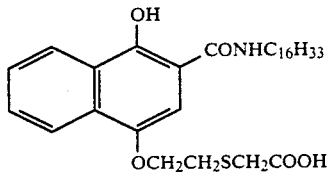
ExC-7'
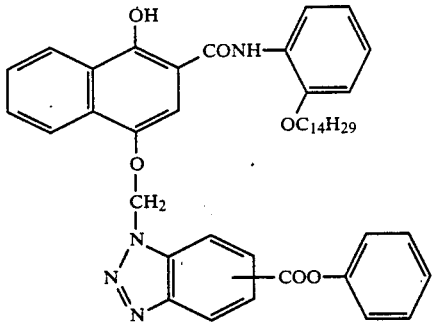
ExM-9'
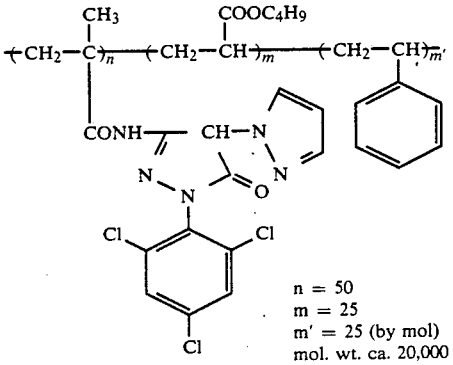
n = 50
m = 25
m' = 25 (by mol)
mol. wt. ca. 20,000

-continued
ExM-10′
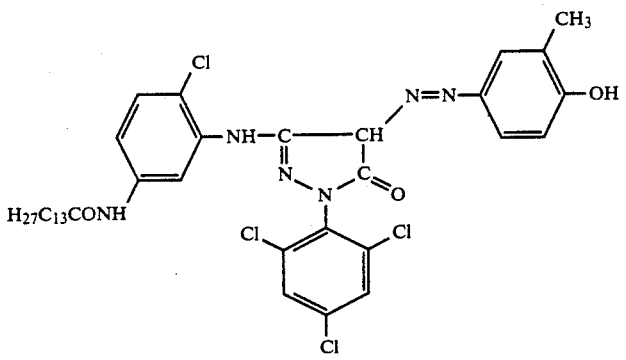
ExM-11′
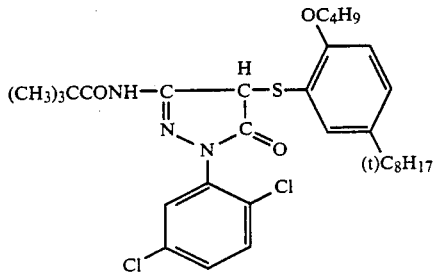
ExM-12′
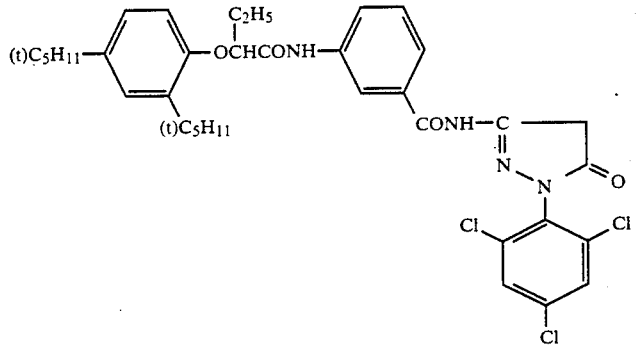
ExM-13′
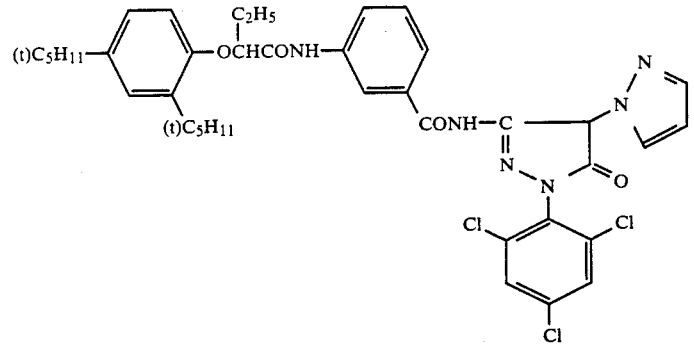
ExY-16′
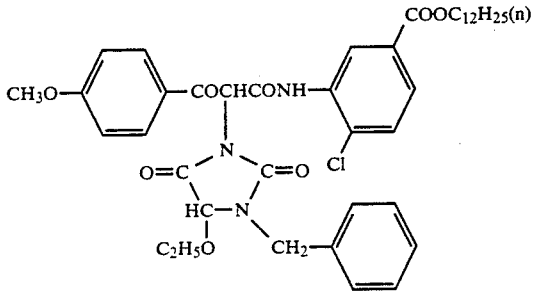

-continued
Cpd-1'
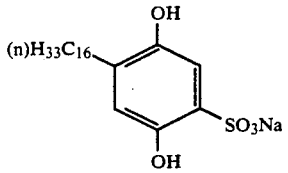
Cpd-2'
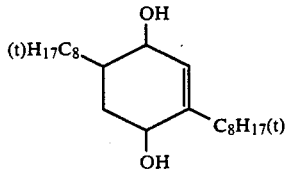
ExS-1'
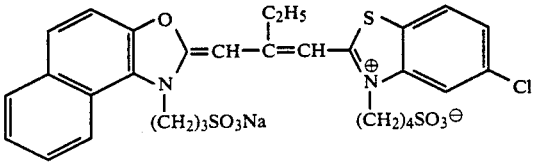
ExS-2'
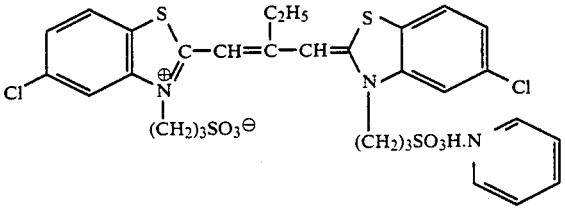
ExS-3'
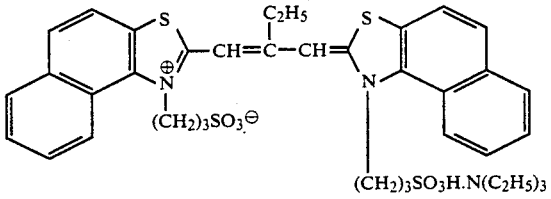
ExS-4'
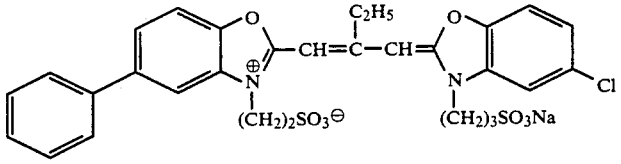
ExS-5'
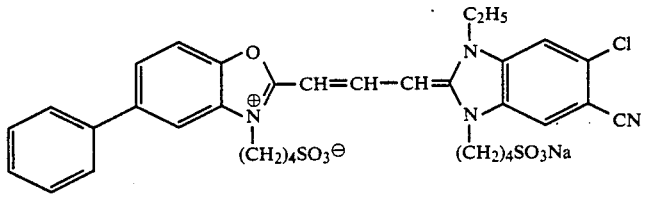
ExS-6'
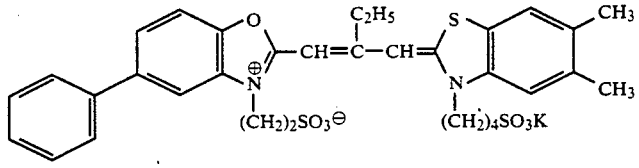

-continued

ExS-7'

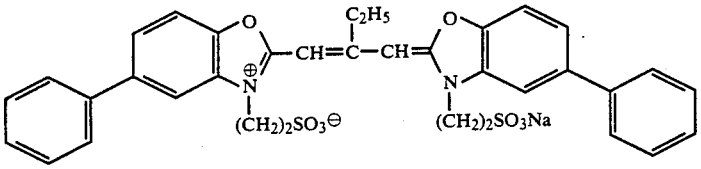

ExS-8'

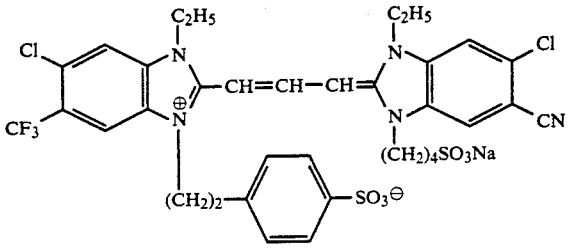

ExS-9'

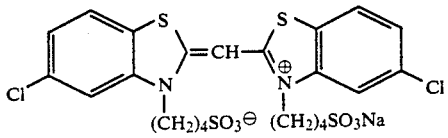

H-1'

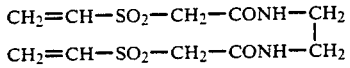

Cpd-3'

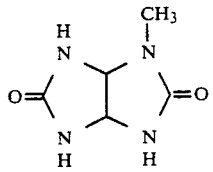

Cpd-4'

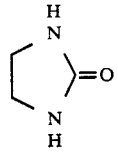

The sample No. 201 was cut into a film strip of 35 mm width and this was set into a camera and exposed in a standard manner. The exposed film was processed in lengths of 500 m, and steady-state processing solutions were established by means of a constant feed of the exposed film to the process in conjunction with a constant rate of replenishment of the processing solutions.

TABLE 3

Photographic Processing Steps

| Step | Processing Temp. | Time | Amount of Replenisher* | Tank Capacity |
|---|---|---|---|---|
| Color Development | 38.0° C. | 3 min 15 sec | 21 ml | 5 liters |
| Bleaching | 38.0° C. | 45 sec | 4.5 ml | 2 liters |
| Fixation (1) | 38.0° C. | 45 sec | (2-tank counter-current system from (2) to (1)) | 2 liters |
| Fixation (2) | 38.0° C. | 45 sec | 30 ml | 2 liters |
| Stabilization (1) | 38.0° C. | 20 sec | (3-tank counter-current system from (3) to (2) to (1) | 1 liter |
| Stabilization (2) | 38.0° C. | 20 sec | | 1 liter |
| Stabilization (3) | 38.0° C. | 20 sec | 35 ml | 1 liter |
| Drying | 55° C. | 1 min 00 sec | | |

*Amount of Replenisher: per m of sample having a 35 mm width.

The automatic developing machine used for processing the samples was equipped with the same jet stream-stirring means as in Example 1 for stirring the fixing solution during processing.

The processing solutions used in the above-described steps were as follows:

| | Mother Solution (g) | Replenisher (g) |
|---|---|---|
| Color Developer: | | |

-continued

| | Mother Solution (g) | Replenisher (g) |
|---|---|---|
| Diethylenetriaminepentaacetic acid | 5.0 | 7.0 |
| Sodium sulfite | 4.0 | 6.0 |
| Potassium carbonate | 30.0 | 35.0 |
| Potassium bromide | 1.3 | 0.2 |
| Potassium iodide | 1.2 mg | — |
| Hydroxylamine sulfate | 2.0 | 4.0 |
| 4-(N-ethyl-N-β-hydroxyethyl-amino)-2-methylaniline sulfate | 4.7 | 6.5 |
| 1-Hydroxyethylidene-1,1-diphosphonic acid | 3.0 | 4.0 |
| Water to make | 1.0 l | 1.0 l |
| pH | 10.05 | 10.20 |
| Bleaching Solution: | | |
| Bleaching agent (from Table 4) | 0.33 mol | 0.50 mol |
| 1,3-Diaminopropanetetraacetic acid | 3.0 | 5.0 |
| Ammonium bromide | 100 | 150 |
| Acetic acid | 50 | 80 |
| Ammonium nitrate | 30 | 40 |
| Water to make | 1.0 l | 1.0 l |
| pH (adjusted with acetic acid and ammonia) | 4.0 | 3.3 |
| Fixing Solution: | | |
| 1-Hydroxyethylidene-1,1-diphosphonic acid | 7.0 | 10.0 |
| Disodium Ethylenediaminetetra-acetate | 7.0 | 10.0 |
| Ammonium sulfite | 16.0 | 25.0 |
| Ammonium thiosulfate solution (700 g/liter) | 240 ml | 280 ml |
| Fixing accelerator (see Table 4) | | |
| Water to make | 1.0 l | 1.0 l |
| pH (adjusted with acetic acid and ammonia) | 6.5 | 6.5 |
| Rinsing Water: Mother solution and replenisher were same. | | |

City water was passed through a mixed-bed system column filled with H-type strong acidic cation-exchange resin (Amberlite IR-120B, manufactured by Rohm & Haas Co.) and OH-type anion-exchange resin (Amberlite IR-400, manufactured by Rohm & Haas Co.) such that the calcium and magnesium ion concentration was reduced to 3 mg/liter or less, and then sodium dichloroisocyanurate (20 mg/liter) and sodium sulfate (0.15 g/liter) were added thereto. The resulting solution had a pH value of from: 6.5 to 7.5.

| Stabilizing Solution: | Mother Solution (g) | Replenisher (g) |
|---|---|---|
| Formalin (37%) | 2.0 ml | 3.0 ml |
| Polyoxyethylene-p-monononyl-phenyl Ether (mean polymerization degree 10) | 0.3 | 0.45 |
| Disodium ethylenediaminetetra-acetate | 0.05 | 0.08 |
| Water to make | 1.0 l | 1.0 l |
| pH | 5.0 to 8.0 | 5.0 to 8.0 |

Sample No. 201 was exposed through a wedge with an exposure of 20 cMS and then processed with the previously prepared equilibrated running solution in the same manner as in Example 1. In the thus processed sample, the silver remaining in the maximum density area (Dmax) was determined with a fluorescent X-ray. The yellow density in the minimum density area (Dmin) was measured with Macbeth Densitometer. After the sample was stored at 80° C. for 2 weeks, the yellow density was again measured. The results obtained are shown in Table 4 below.

It is clear from the results of Table 4, that the samples processed with the bleaching solution containing the 1,3-diaminopropanetetraacetato/iron complex of the present invention and with the fixing solution containing the fixing accelerator of the present invention were substantially desilvered both before and after the running test, while the comparative samples were incompletely desilvered, especially after the running test. Thus, the desilvering efficiency of the method of the present invention is considerably improved. Moreover, the increase in yellow background density upon storage of the sample processed according to the method of the present invention was negligible.

TABLE 4

| Process No. | Bleaching Agent | Fixing Accelerator* | Ag Remaining (μg/cm²) Before Running Test | Ag Remaining (μg/cm²) After Running Test | Variation of Yellow Minimum Density Before and After Aging Test | Remarks |
|---|---|---|---|---|---|---|
| 14 | Ethylenediamine-tetraacetato/Ferric Complex | — | 22.2 | 36.5 | 0.08 | Comparative Sample |
| 15 | 1,3-Diamino-propanetetra-acetato/Ferric Complex | — | 3.6 | 10.2 | 0.15 | Comparative Sample |
| 16 | 1,3-Diamino-propanetetra-acetato/Ferric Complex | Thioglycol | 1.2 | 9.7 | 0.10 | Comparative Sample |
| 17 | 1,3-Diamino-propanetetra-acetato/Ferric Complex | (1) | 0.8 | 1.0 | 0.07 | Sample of the Invention |
| 18 | 1,3-Diamino-propanetetra-acetato/Ferric Complex | (28) | 0.9 | 1.2 | 0.08 | Sample of the Invention |
| 19 | 1,3-Diamino-propanetetra-acetato/Ferric Complex | (44) | 1.2 | 1.5 | 0.09 | Sample of the Invention |
| 20 | 1,3-Diamino-propanetetra-acetato/Ferric | (52) | 1.1 | 1.3 | 0.08 | Sample of the Invention |

TABLE 4-continued

| Process No. | Bleaching Agent | Fixing Accelerator* | Ag Remaining ($\mu g/cm^2$) Before Running Test | Ag Remaining ($\mu g/cm^2$) After Running Test | Variation of Yellow Minimum Density Before and After Aging Test | Remarks |
|---|---|---|---|---|---|---|
| 21 | Complex 1,3-Diamino-propanetetra-acetato/Ferric Complex | (92) | 1.2 | 1.6 | 0.09 | Sample of the Invention |

*Amount Added: $3 \times 10^{-2}$ mol/liter (both to mother solution and to replenisher)

EXAMPLE 3

Plural layers each having the composition described below were provided on a cellulose triacetate film support coated with a subbing layer to prepare a multilayer color photographic material (Sample No. 301).

The compositions of the layers are described below. The amount coated is represented by units of g(silver)/$m^2$ for colloidal silver and silver halide, by units of g/$m^2$ for couplers, additives and gelatin, and by units of mols per mol of silver halide present in the same layer for the sensitizing dyes.

| | |
|---|---|
| First Layer: Anti-halation Layer | |
| Black colloidal silver | 0.18 as Ag |
| Gelatin | 0.40 |
| Second Layer: Interlayer | |
| 2,5-Di-t-pentadecylhydroquinone | 0.18 |
| EX-1" | 0.07 |
| Ex-3" | 0.02 |
| EX-12" | 0.002 |
| U-1" | 0.06 |
| U-2" | 0.08 |
| U-3" | 0.10 |
| HBS-1" | 0.10 |
| HBS-2" | 0.02 |
| Gelatin | 1.04 |
| Third Layer: First Red-sensitive Emulsion Layer | |
| Emulsion A | 0.25 as Ag |
| Emulsion B | 0.25 as Ag |
| Sensitizing Dye I | $6.9 \times 10^{-5}$ |
| Sensitizing Dye II | $1.8 \times 10^{-5}$ |
| Sensitizing Dye III | $3.1 \times 10^{-4}$ |
| EX-2" | 0.335 |
| EX-10" | 0.020 |
| Gelatin | 0.87 |
| Fourth Layer: Second Red-sensitive Emulsion Layer | |
| Emulsion C | 1.0 as Ag |
| Sensitizing Dye I | $5.1 \times 10^{-5}$ |
| Sensitizing Dye II | $1.4 \times 10^{-5}$ |
| Sensitizing Dye III | $2.3 \times 10^{-4}$ |
| EX-2" | 0.400 |
| EX-3" | 0.050 |
| EX-10" | 0.015 |
| Gelatin | 1.30 |
| Fifth Layer: Third Red-sensitive Emulsion Layer | |
| Emulsion D | 1.60 as Ag |
| Sensitizing Dye I | $5.4 \times 10^{-5}$ |
| Sensitizing Dye II | $1.4 \times 10^{-5}$ |
| Sensitizing Dye III | $2.4 \times 10^{-4}$ |
| EX-3" | 0.010 |
| EX-4" | 0.080 |
| EX-2" | 0.097 |
| HBS-1" | 0.22 |
| HBS-2" | 0.10 |
| Gelatin | 1.63 |
| Sixth Layer: Interlayer | |
| EX-5" | 0.040 |
| HBS-1" | 0.020 |
| Gelatin | 0.80 |
| Seventh Layer: First Green-sensitive Emulsion Layer | |
| Emulsion A | 0.15 as Ag |
| Emulsion B | 0.15 as Ag |

-continued

| | |
|---|---|
| Sensitizing Dye V | $3.0 \times 10^{-5}$ |
| Sensitizing Dye VI | $1.0 \times 10^{-4}$ |
| Sensitizing Dye VII | $3.8 \times 10^{-4}$ |
| EX-6" | 0.260 |
| EX-1" | 0.021 |
| EX-7" | 0.030 |
| EX-8" | 0.025 |
| HBS-1" | 0.100 |
| HBS-3" | 0.010 |
| Gelatin | 0.63 |
| Eighth Layer: Second Green-sensitive Emulsion Layer | |
| Emulsion C | 0.45 as Ag |
| Sensitizing Dye V | $2.1 \times 10^{-5}$ |
| Sensitizing Dye VI | $7.0 \times 10^{-5}$ |
| Sensitizing Dye VII | $2.6 \times 10^{-4}$ |
| EX-6" | 0.094 |
| EX-8" | 0.018 |
| EX-7" | 0.026 |
| HBS-1" | 0.160 |
| HBS 3" | 0.008 |
| Gelatin | 0.50 |
| Ninth Layer: Third Green-sensitive Emulsion Layer | |
| Emulsion E | 1.2 as Ag |
| Sensitizing Dye V | $3.5 \times 10^{-5}$ |
| Sensitizing Dye VI | $8.0 \times 10^{-5}$ |
| Sensitizing Dye VII | $3.0 \times 10^{-4}$ |
| EX-13" | 0.015 |
| EX-11" | 0.100 |
| EX-1" | 0.025 |
| HBS-1" | 0.25 |
| HBS 2" | 0.10 |
| Gelatin | 1.54 |
| Tenth Layer: Yellow Filter Layer | |
| Yellow Colloidal Silver | 0.05 as Ag |
| EX-5" | 0.08 |
| HBS-1" | 0.03 |
| Gelatin | 0.95 |
| Eleventh Layer: First Blue-sensitive Emulsion Layer | |
| Emulsion A | 0.08 as Ag |
| Emulsion B | 0.07 as Ag |
| Emulsion F | 0.07 as Ag |
| Sensitizing Dye VIII | $3.5 \times 10^{-4}$ |
| EX-9" | 0.721 |
| EX-8" | 0.042 |
| HBS 1" | 0.28 |
| Gelatin | 1.10 |
| Twelfth Layer: Second Blue-sensitive Emulsion Layer | |
| Emulsion G | 0.45 as Ag |
| Sensitizing Dye VIII | $2.1 \times 10^{-4}$ |
| EX-9" | 0.154 |
| EX-10" | 0.007 |
| HBS-1" | 0.05 |
| Gelatin | 0.78 |
| Thirteenth Layer: Third Blue-sensitive Emulsion Layer | |
| Emulsion H | 0.77 as Ag |
| Sensitizing Dye VIII | $2.2 \times 10^{-4}$ |
| EX-9" | 0.20 |
| HBS-1" | 0.07 |
| Gelatin | 0.69 |
| Fourteenth Layer: First Protective Layer | |
| Emulsion I | 0.5 as Ag |
| U-4" | 0.11 |
| U-5" | 0.17 |

-continued

| | |
|---|---|
| HBS-1" | 0.05 |
| Gelatin | 1.00 |
| Fifteenth Layer: Second Protective Layer | |
| Polymethyl Acrylate Grains (diameter 1.5 μm) | 0.54 |
| S-1" | 0.20 |

-continued

| | |
|---|---|
| Gelatin | 1.20 |

Gelatin Hardening agent (H-1) and surfactant were added to each layer, in addition to the above-described components.

TABLE 5

| Emulsion | Mean AgI-Content (%) | Mean Grain Size (μm) | Fluctuation Coefficient of Grain Size (%) | Ratio of Diameter/Thickness | Silver Content (AgI Content mol %) |
|---|---|---|---|---|---|
| A | 4.3 | 0.45 | 27 | 1 | core/interlayer/shell = 8/16/76 (0/27/0); 3-layered grains |
| B | 8.7 | 0.70 | 14 | 1 | core/interlayer/shell = 8/16/76 (0/27/0); 3-layered grains |
| C | 10 | 0.75 | 30 | 2 | core/shell = ½ (24/3); 2-layered grains |
| D | 16 | 1.05 | 35 | 2 | core/shell = ½ (40/0); 2-layered grains |
| E | 10 | 1.05 | 35 | 3 | core/shell = ½ (24/3); 2-layered grains |
| F | 4.3 | 0.25 | 28 | 1 | core/interlayer/shell = 8/16/76 (0/27/0); 3-layered grains |
| G | 14 | 0.75 | 25 | 2 | core/shell = ½ (40/0); 2-layered grains |
| H | 14 | 1.30 | 25 | 3 | core/shell = ½ (24/3); 2-layered grains |
| I | 1 | 0.07 | 15 | 1 | |

Compounds used for preparing the samples are as follows:

EX-1"

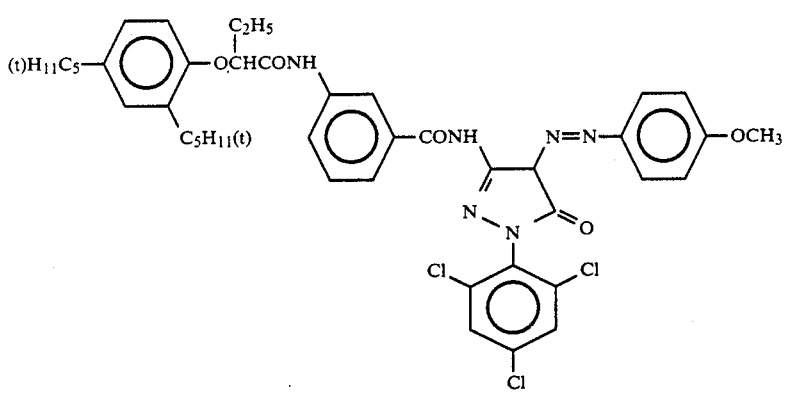

EX-2"

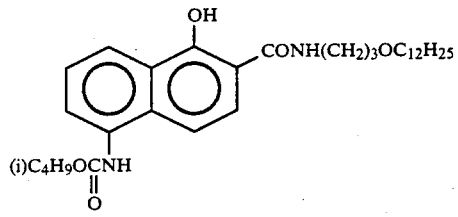

EX-3"

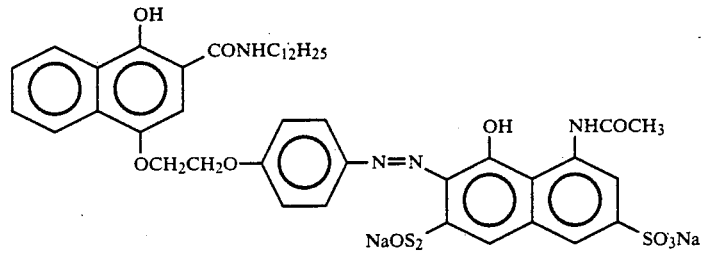

-continued
EX-4''
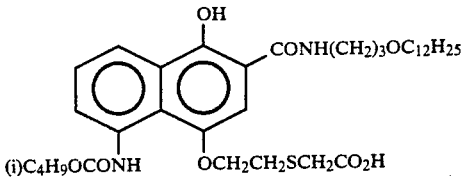
EX-5''
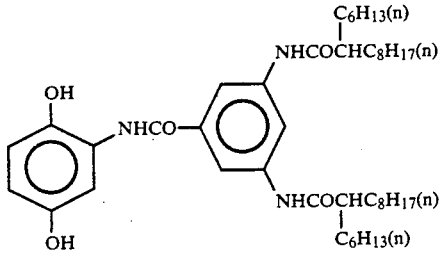
EX-6''
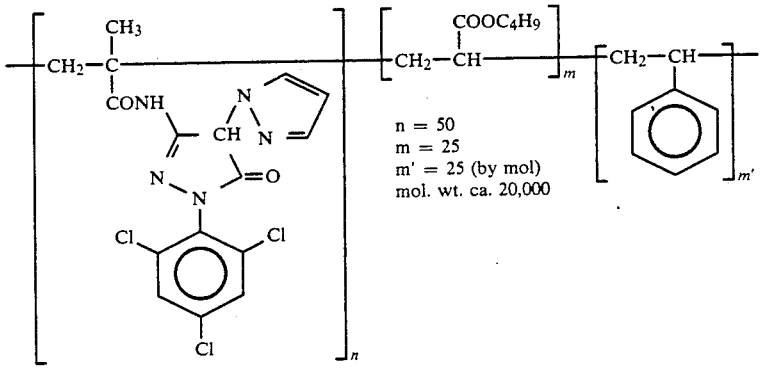
EX-7''
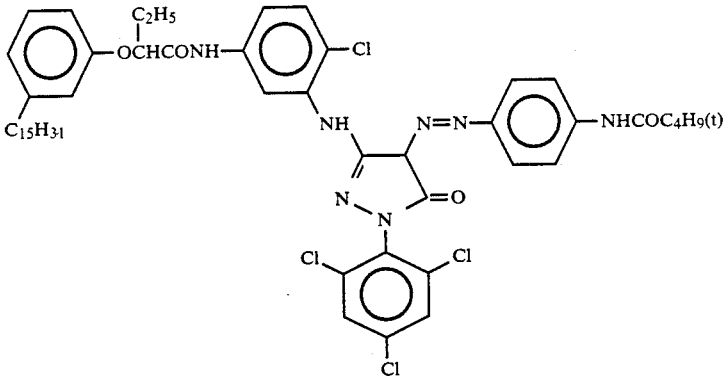
EX-8''
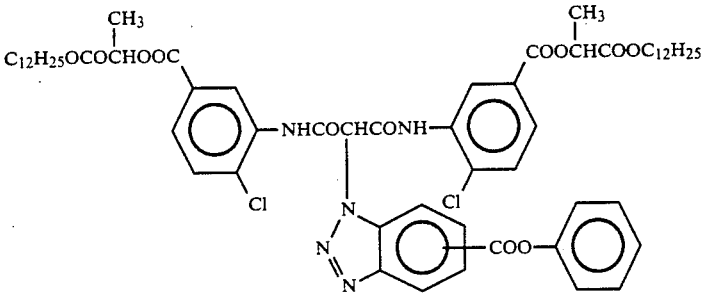

-continued
EX-9″
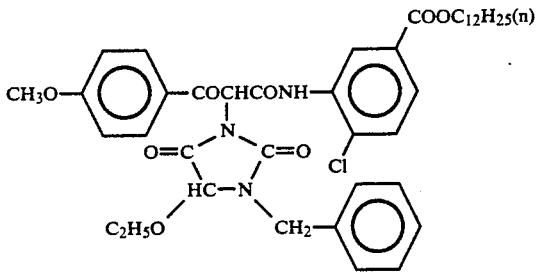
EX-10″
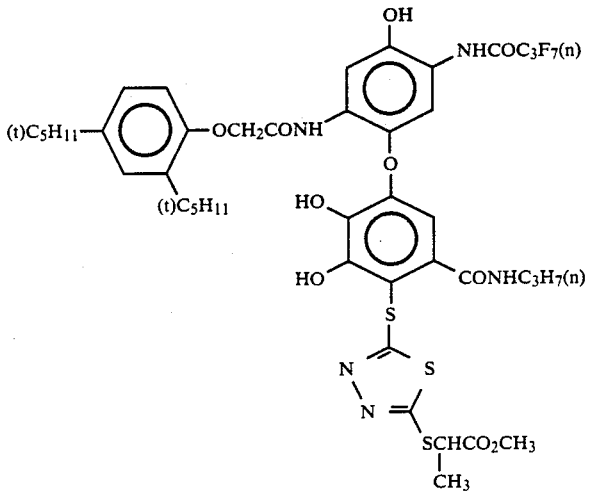
EX-11″
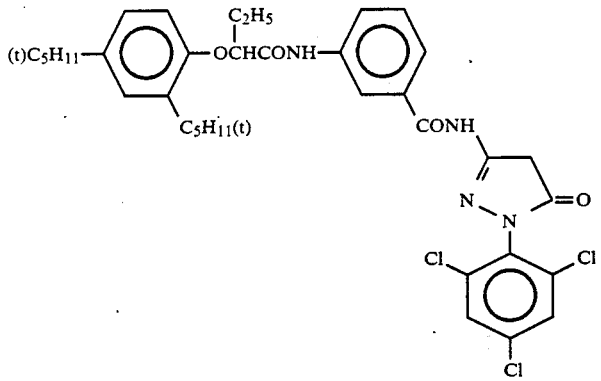
EX-12″
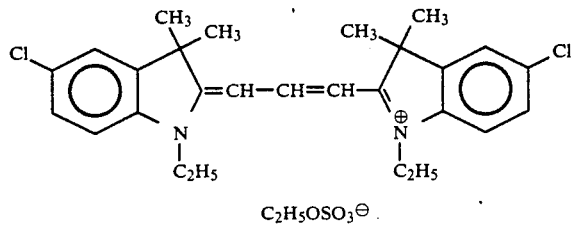

-continued
EX-13″
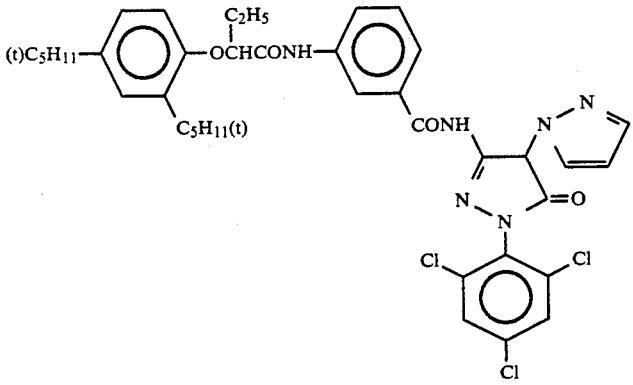
U-1″
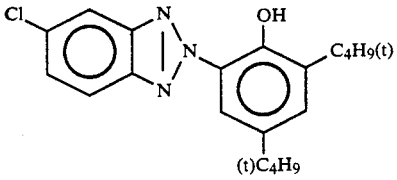
U-2″
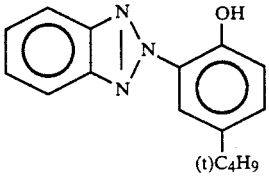
U-3″
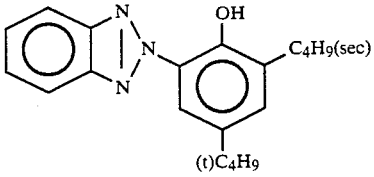
U-4″
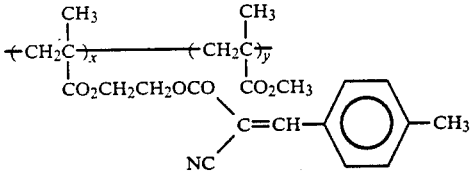
x:y = 70:30 (wt %)
UV-5″
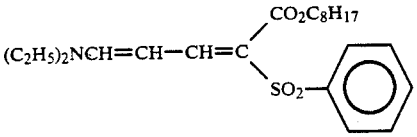
Tricresyl Phosphate — HBS-1″
Di-n-butyl Phthalate — HBS-2″
HBS-3″
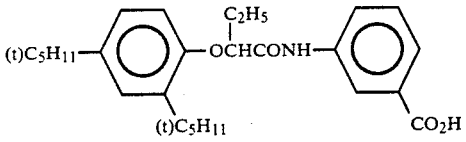

-continued

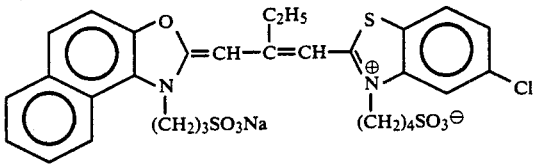

Sensitizing Dye I

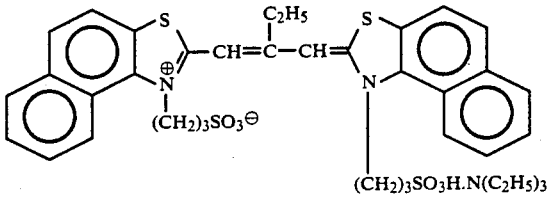

Sensitizing Dye II

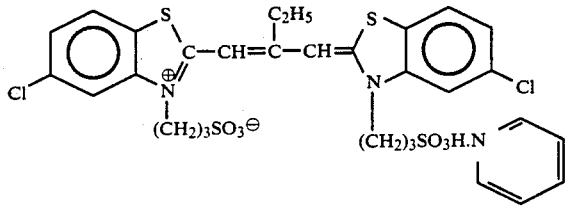

Sensitizing Dye III

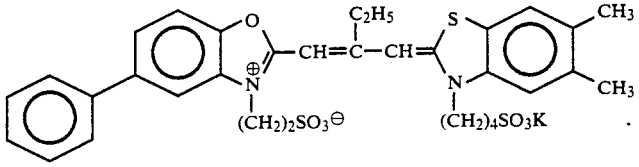

Sensitizing Dye V

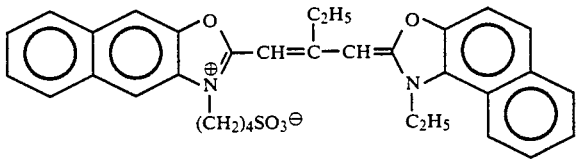

Sensitizing Dye VI

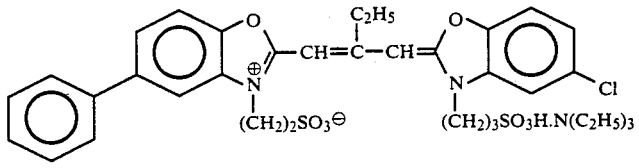

Sensitizing Dye VII

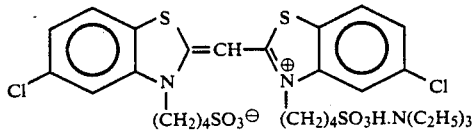

Sensitizing Dye VIII

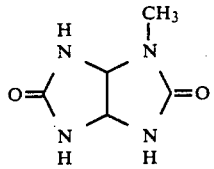

S-1″

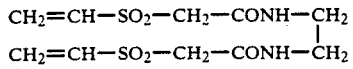

H-1″

Next, Sample No. 302 was prepared in the same manner as Sample No. 301, except that the magenta coupler EX-6″ used in the seventh layer was replaced by 0.6 mol of PM-4, the magenta coupler EX-6″ used in the eighth layer was replaced by 0.094 mol of PM-4, the magenta couplers EX-11″ and EX-13″ used in the ninth layer were replaced by 0.08 mol of PM-4, and the amounts of HBS-1" and HBS-2" were accordingly varied.

Each of the samples thus prepared was cut into a film of 35 mm width and exposed to an exposure of 100 cMS through a wedge. The thus exposed samples were then processed in the same manner as in Example 1, whereupon the compound No. 5 was used as the fixing accelerator.

The amount of silver remaining in the maximum density area Dmax of each sample and the magenta density thereof were measured in the same manner as in Example 2, whereupon the pH value of the bleaching solution only was elevated than that of the solution used in Example 2 by 1.0 and the influence, if any, on the variation of the processed samples was checked. The results obtained are shown in Table 6 below.

TABLE 6

| Sample No. | Silver Amount Remaining on Processed Sample after Running Test | Variation of Yellow Stain Density (DB) Dmin before and after Storage | Magenta Density (DG) Dmin* Immediately after Processing | Note |
|---|---|---|---|---|
| 301 | 1.3 | 0.08 | 0.65 | (A) |
| 302 | 1.3 | 0.07 | 0.58 | (B) |

*The value indicates a green-filter density containing masked density.

In both cases (A) and (B) of the present invention, the desilvering rate was high and the increase in staining of the stored samples was small. The case (B) where a pyrazoloazole coupler was used was better than the case (A) where a pyrazolone coupler was used, as the stain density (DG, green filter density) was smaller. Accordingly, it is noted that the method of the present invention is preferably applicable to the photographic material of type (B) using a pyrazoloazole coupler.

While the invention has been described in detail and with reference to specific embodiments thereof, it will be apparent to one skilled in the art that various changes and modifications can be made therein without departing from the spirit and scope thereof.

What is claimed is:

1. A method for processing a silver halide color photographic material which comprises the steps of, after imagewise exposure to actinic radiation and color developing, processing said silver halide color photographic material with a bleaching bath, and then processing with a fixing bath, wherein the bleaching bath has a pH value of from 2.5 to 5.5 and contains a (1,3-diaminopropane-tetraacetato)iron(III) complex salt in an amount of at least 0.2 mol/liter and an organic acid in an amount of at least 0.5 mol/liter, and the fixing bath contains at least one compound selected from formulae (I), (II), (III), (IV), and (V):

$$R^1-(X-R^3)_m-X-R^2 \qquad (I)$$

wherein m represents 0 or an integer of from 1 to 4; $R^1$ and $R^2$ each represent a substituted or unsubstituted alkyl group; $R^3$ represents a substituted or unsubstituted alkylene group, provided that when m is 2 or more, the $R^3$ groups in each of the $(X-R^3)$ segments may be the same or different; and X represents sulfur, oxygen, -continued (II)

wherein Z represents $-OR^{15}$ or $-SR^{16}$; $R^{11}$, $R^{12}$, $R^{13}$, $R^{14}$, $R^{15}$ and $R^{16}$ each represents an alkyl group, an alkenyl group, an aralkyl group, an aryl group or a heterocyclic group; and $R^{11}$ and $R^{12}$, $R^{13}$ and $R^{14}$, or $R^{11}$ and $R^{13}$, $R^{11}$ and $R^{15}$, or $R^{11}$ and $R^{16}$ may be bonded to each other to form a 5-membered or 6-membered hetero-ring:

(III)

wherein A represents an alkylene group; $R^{20}$ represents $-NH_2$, $-NHR^{21}$, $-CONHR^{24}$, $-OR^{24}$, $-COOM$, $-COOR^{21}$, $-SO_2NHR^{24}$, $-NHCOR^{21}$ or $-SO_3M$; p represents 1 or 2; L represents $-S^{\ominus}$ when $R^{20}$ is and L represents $-SM$ otherwise; $R^{21}$, $R^{22}$ and $R^{23}$ each represents an alkyl group; $R^{24}$ represents hydrogen or an alkyl group; and M represents hydrogen or a cation:

(IV)

wherein $R^{31}$ represents a hydroxyl group, an alkyl group, an alkenyl group, a cycloalkyl group, an aryl group, a heterocyclic group, an amino group, an acyloxy group or an alkyloxy group; $R^{32}$ represents hydrogen, an alkyl group, a cycloalkyl group, an aryl group or a heterocyclic group; and $R^{33}$ represents an alkyl group, an alkenyl group, a cycloalkyl group, an aryl group or a heterocyclic group;

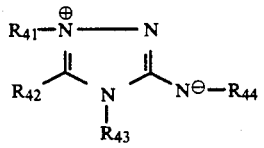

(V)

wherein $R_{41}$, $R_{42}$, $R_{43}$ and $R_{44}$ each represents a substituted or unsubstituted alkyl group, a substituted or unsubstituted alkenyl group, a substituted or unsubstituted cycloalkyl group, a substituted or unsubstituted aryl group or a substituted or unsubstituted heterocyclic group; or $R_{41}$ and $R_{42}$, or $R_{43}$ and $R_{44}$ may be bonded to each other to form a ring.

2. A method for processing a silver halide color photographic material as in claim 1, wherein said photographic material contains at least one magenta coupler compound of general formula:

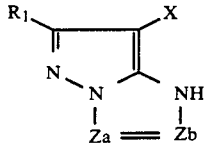

wherein Za and Zb each represents —CH=,

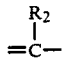

or =N—; $R_1$ and $R_2$ each represents hydrogen or a substituent; X represents a hydrogen atom or a group which releases upon coupling with the oxidation product of an aromatic primary amine developing agent; and when Za=Zb is carbon-carbon double bond, Za=Zb is optionally part of an aromatic ring moiety.

3. A method for processing a silver halide color photographic material as in claim 1, wherein said bleaching bath contains a (1,3-diaminopropane-tetraacetato)iron-(III) complex salt in an amount of from 0.2 to 0.5 mol/-liter.

4. A method for processing a silver halide color photographic material as in claim 1, wherein said bleaching bath contains a (1,3-diaminopropane-tetraacetato)iron-(III) complex salt in an amount of from 0.3 to 0.5 mol/-liter.

5. A method for processing a silver halide color photographic material as in claim 1, wherein said bleaching bath has a pH value of from 3.5 to 4.5.

6. A method for processing a silver halide color photographic material as in claim 1, wherein said bleaching bath contains an organic acid in an amount of from 0.5 to 2.5 mol/liter.

7. A method for processing a silver halide color photographic material as in claim 1, wherein said processing constitutes continuous processing.

8. A method for processing a silver halide color photographic material as in claim 7, wherein the replenisher amount of the bleaching bath is from 100 to 1,000 ml per $m^2$ of the photographic material processed.

9. A method for processing a silver halide color photographic material as in claim 7, wherein the replenisher amount of the fixing bath is from 300 to 1,000 ml per $m^2$ of the photographic material processed.

10. A method for processing a silver halide color photographic material as in claim 1, wherein the fixing bath contains said at least one compound selected from formulae (I), (II), (III), (IV) and (V) in an amount of from 0.5 to 30 g/liter.

11. A method for processing a silver halide color photographic material as in claim 1, wherein the time for the desilvering step is from 1 to 4 minutes.

* * * * *